US009477466B2

(12) United States Patent
Nishimoto et al.

(10) Patent No.: US 9,477,466 B2
(45) Date of Patent: Oct. 25, 2016

(54) INFORMATION PROCESSING APPARATUS AND INSTRUCTION OFFLOADING METHOD

(71) Applicant: KABUSHIKI KAISHA TOSHIBA, Minato-ku, Tokyo (JP)

(72) Inventors: Hiroshi Nishimoto, Kawasaki (JP); Yuichiro Oyama, Fuchu (JP); Takeshi Ishihara, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 484 days.

(21) Appl. No.: 14/038,118

(22) Filed: Sep. 26, 2013

(65) Prior Publication Data

US 2014/0089643 A1 Mar. 27, 2014

(30) Foreign Application Priority Data

Sep. 27, 2012 (JP) .................. 2012-214578

(51) Int. Cl.
G06F 12/00 (2006.01)
G06F 9/30 (2006.01)
G06F 9/50 (2006.01)
G06F 9/54 (2006.01)

(52) U.S. Cl.
CPC ........... *G06F 9/3001* (2013.01); *G06F 9/5027* (2013.01); *G06F 9/547* (2013.01); *G06F 2209/509* (2013.01); *Y02B 60/142* (2013.01)

(58) Field of Classification Search
CPC ...................................................... G06F 12/00
See application file for complete search history.

(56) References Cited

U.S. PATENT DOCUMENTS 7,930,422 B2 * 4/2011 Freimuth ............... G06F 13/30
709/234
2013/0159397 A1 6/2013 Yamashita et al.

FOREIGN PATENT DOCUMENTS

| JP | 2010-225122 A | 10/2010 |
| JP | 2010237977 A | 10/2010 |
| JP | 2012161082 A | 8/2012 |
| WO | 2012023175 A1 | 2/2012 |

OTHER PUBLICATIONS

Japanese Office Action dated Aug. 5, 2014 corresponding to Japanese Patent App. No. 2012-214578,8 pp.

* cited by examiner

Primary Examiner — Cheng-Yuan Tseng
(74) Attorney, Agent, or Firm — Ohlandt, Greeley, Ruggiero & Perle, L.L.P.

(57) ABSTRACT

In general, according to one embodiment, an information processing apparatus includes an issuer and a communicator. The issuer issues an offload instruction corresponding to a first process executed in company with a first identifier capable of uniquely specifying a resource of a first arithmetic operation device. The communicator transmits the offload instruction to a second arithmetic operation device and receives a result of execution of the offload instruction from the second arithmetic operation device. In the second arithmetic operation device, the first identifier contained in the offload instruction is converted into a second identifier capable of uniquely specifying a resource of the second arithmetic operation device, and processing specified by the offload instruction is executed.

15 Claims, 32 Drawing Sheets

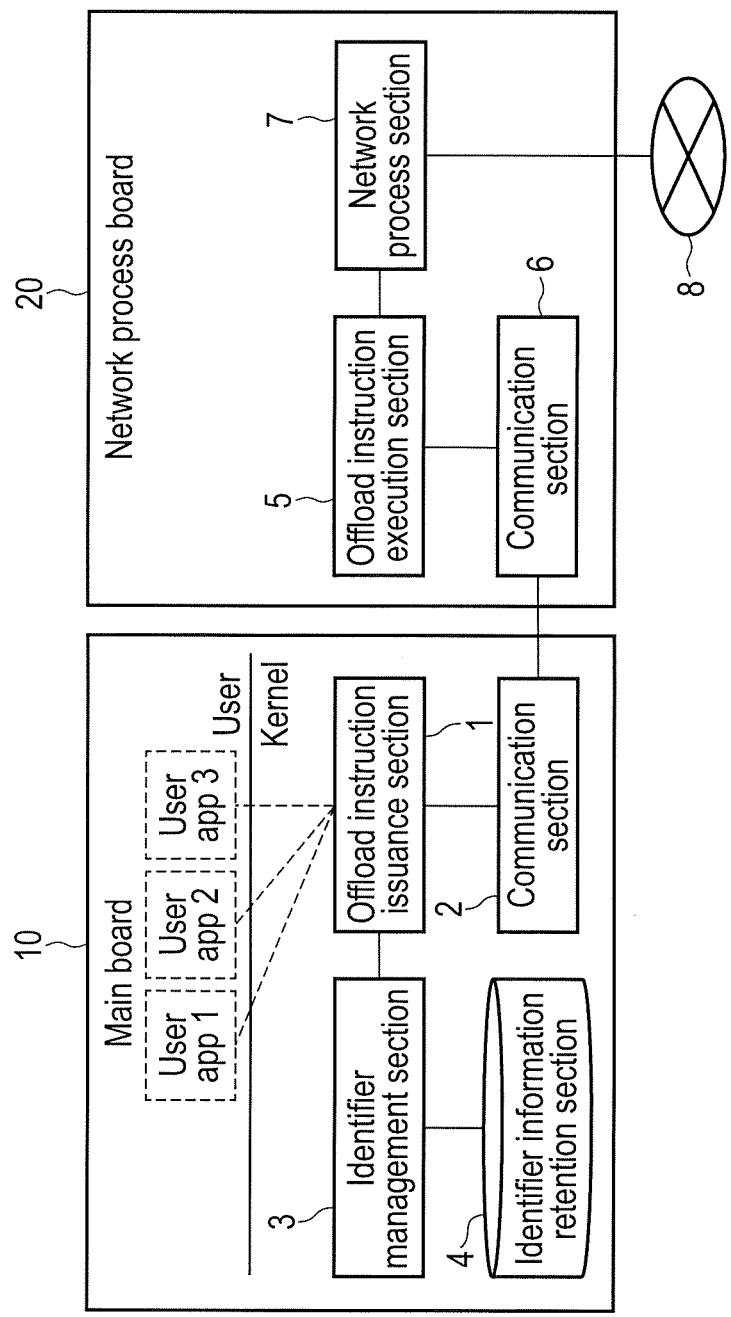
F I G. 1

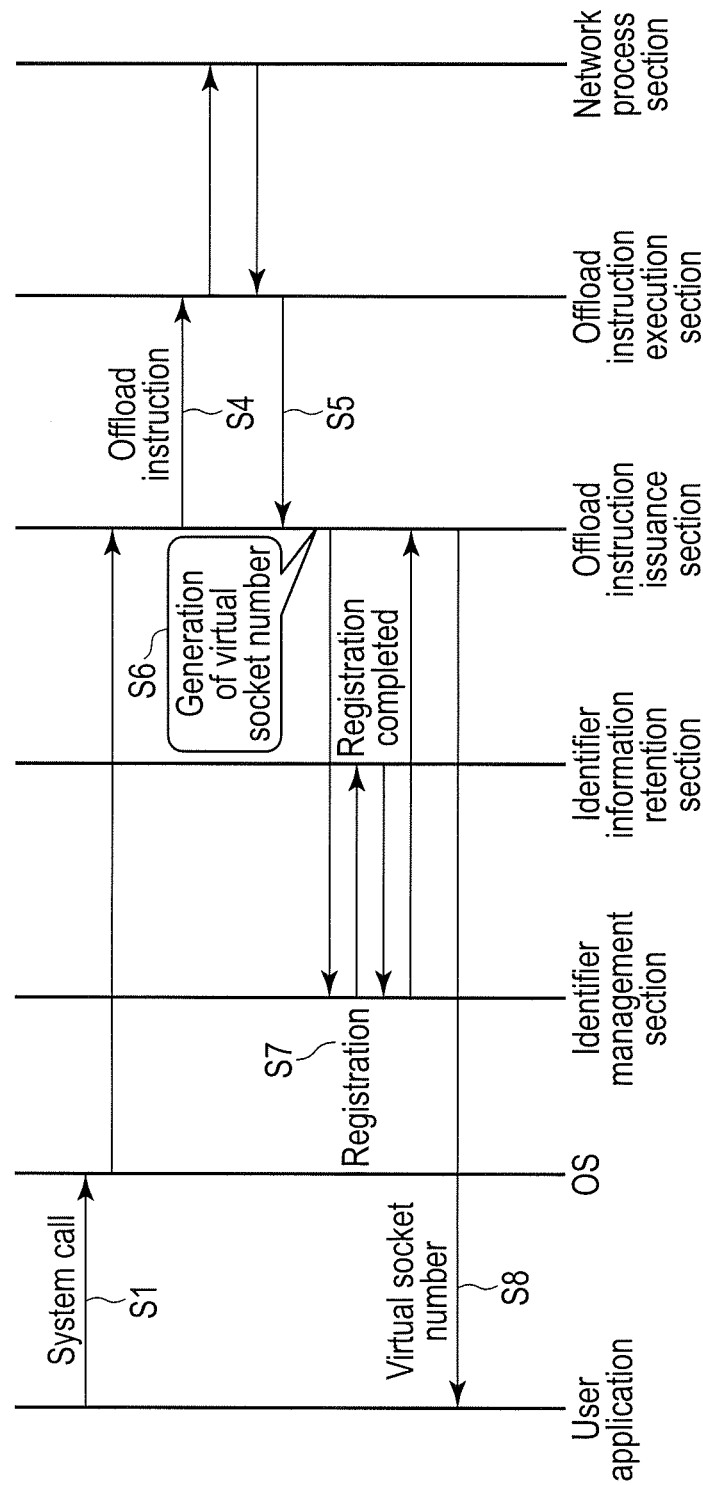
F I G. 3

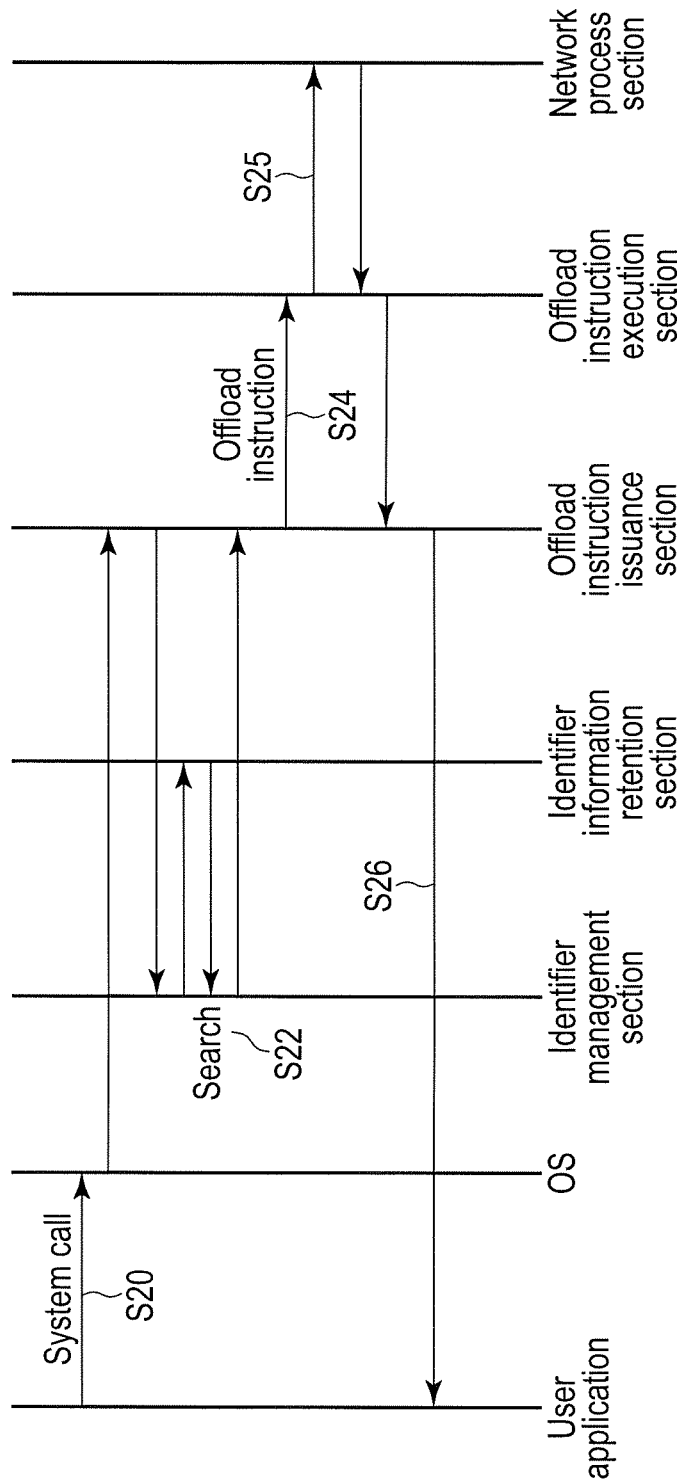
F I G. 5

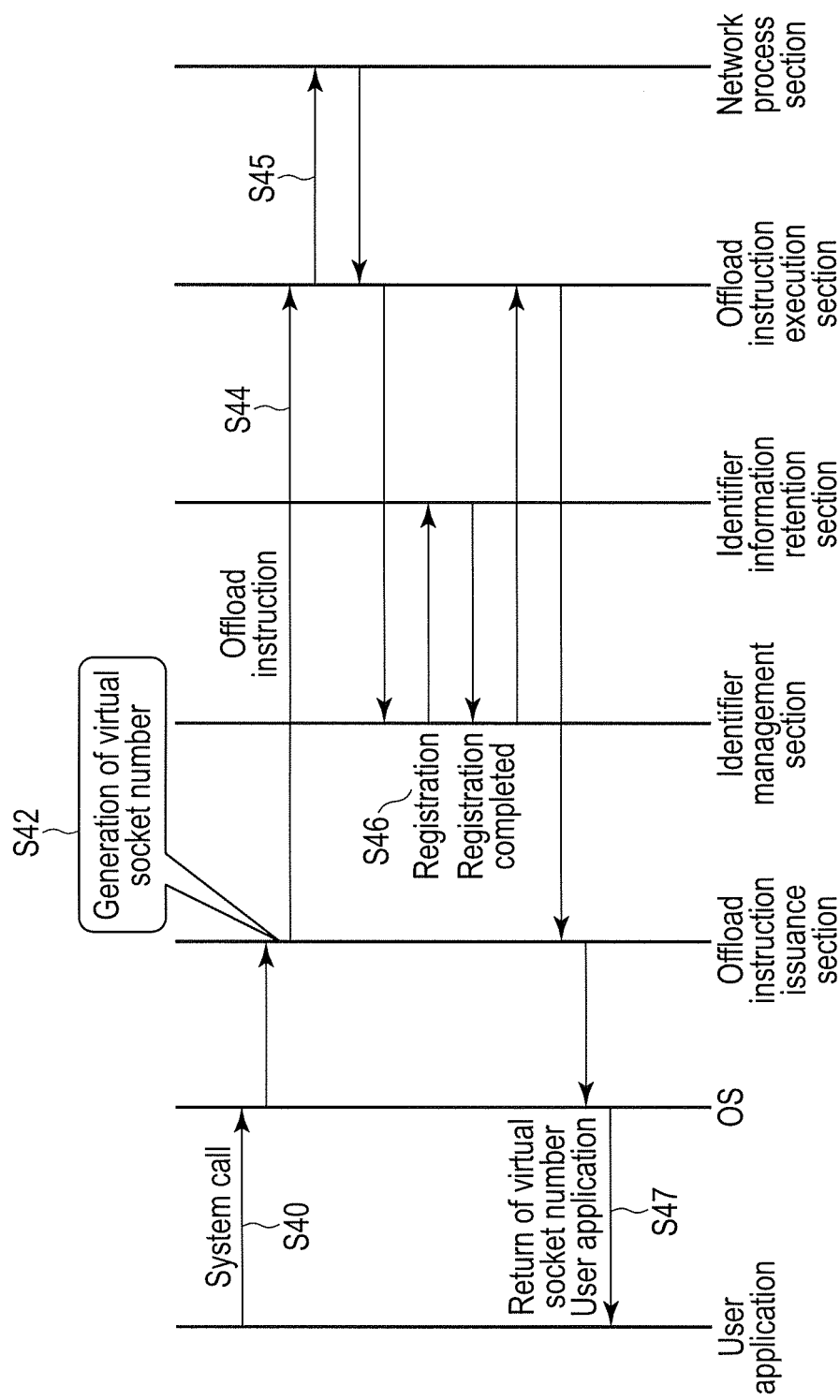
F I G. 10

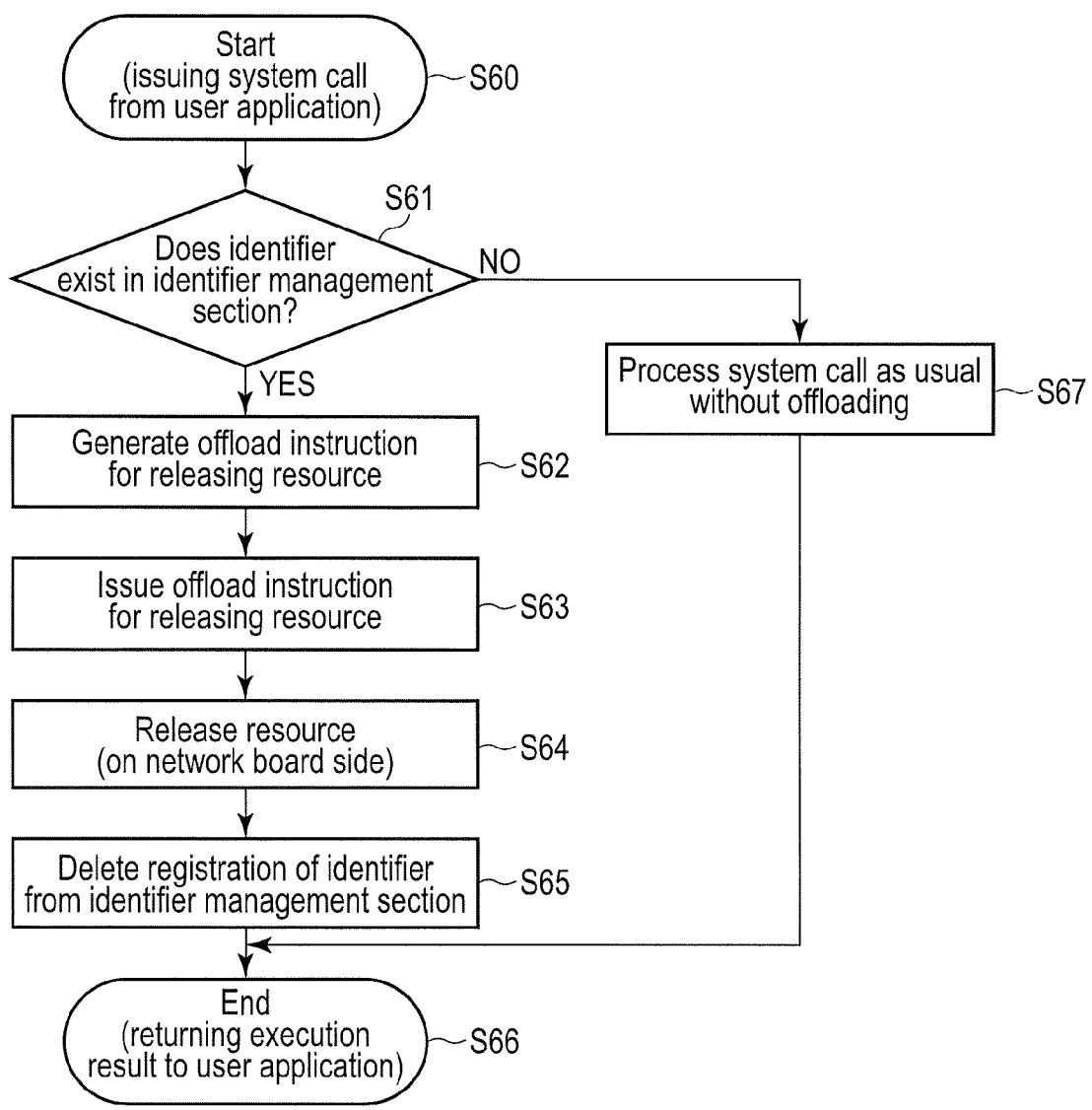
F I G. 13

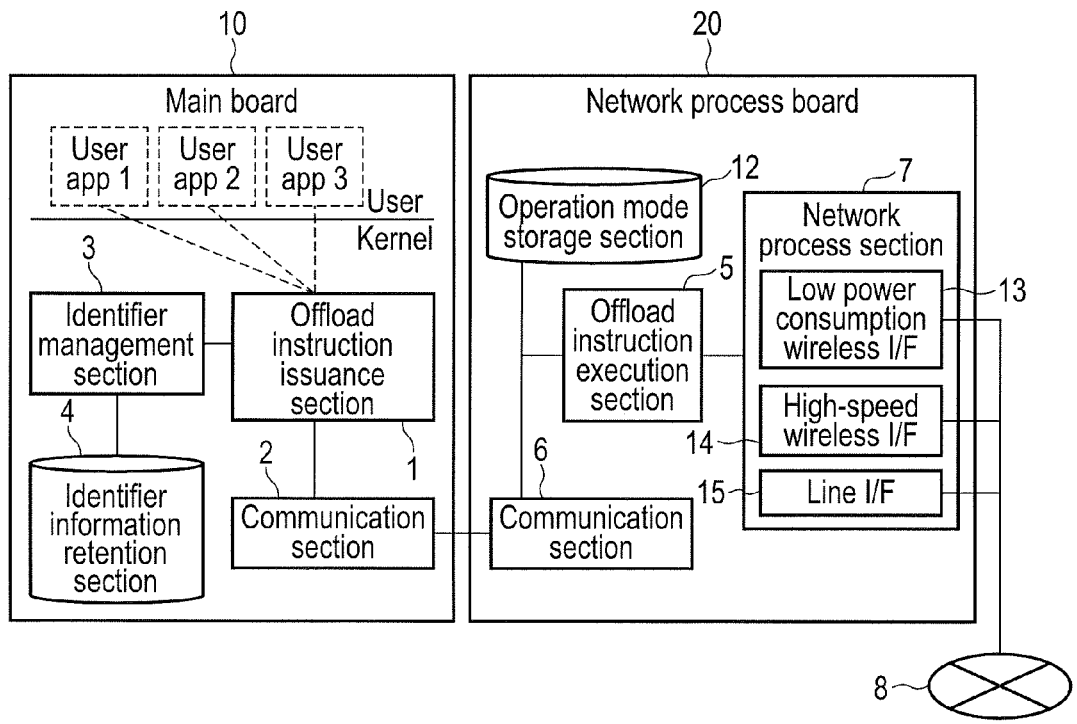
F I G. 17
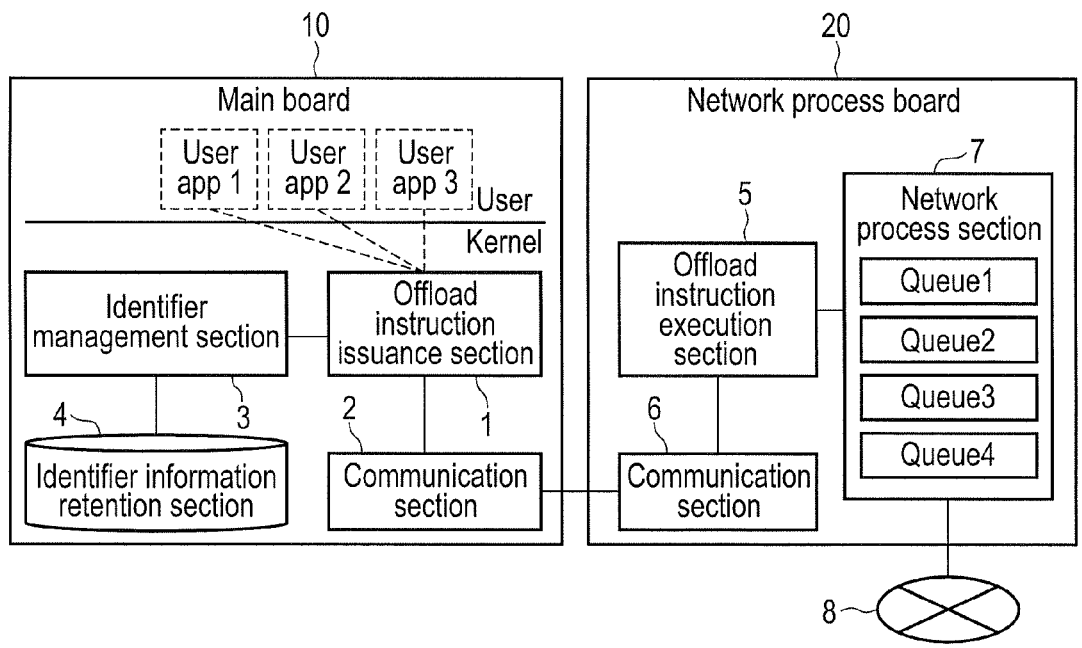
F I G. 18

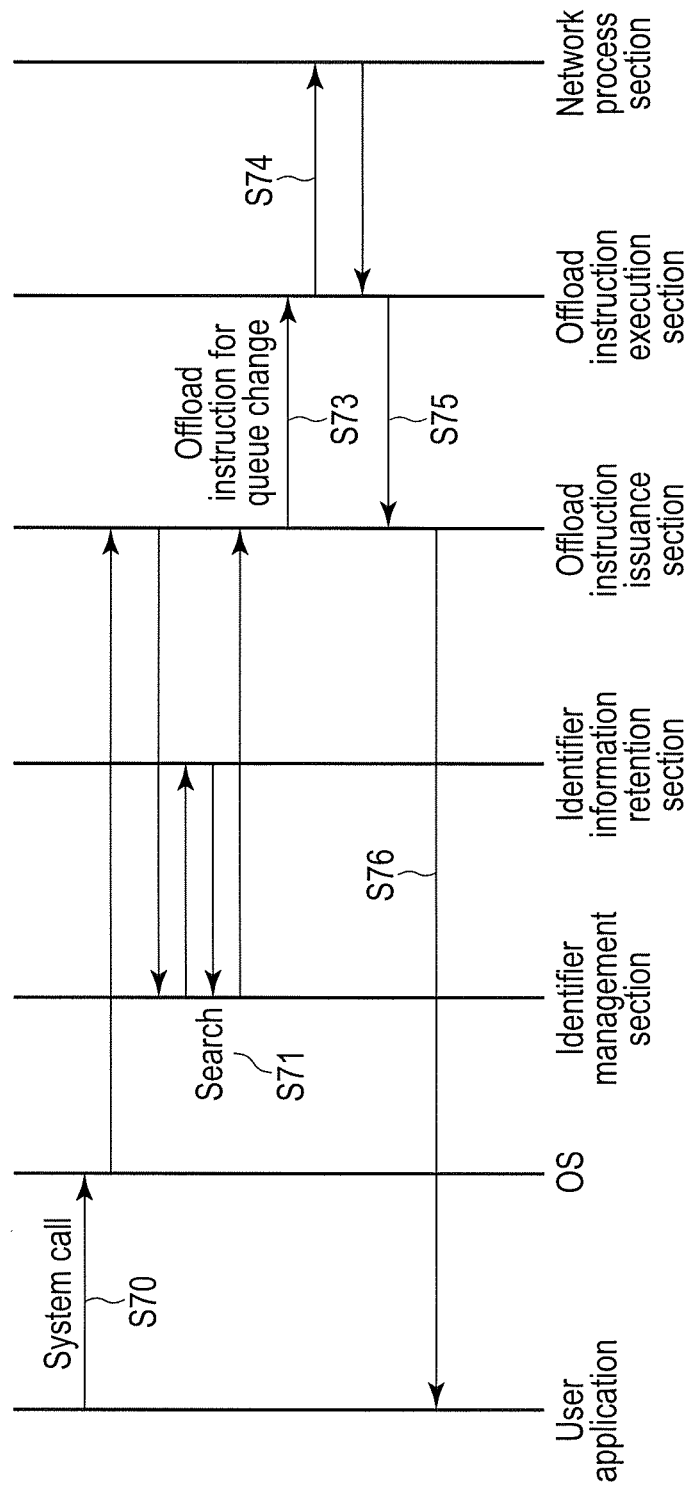
F I G. 20

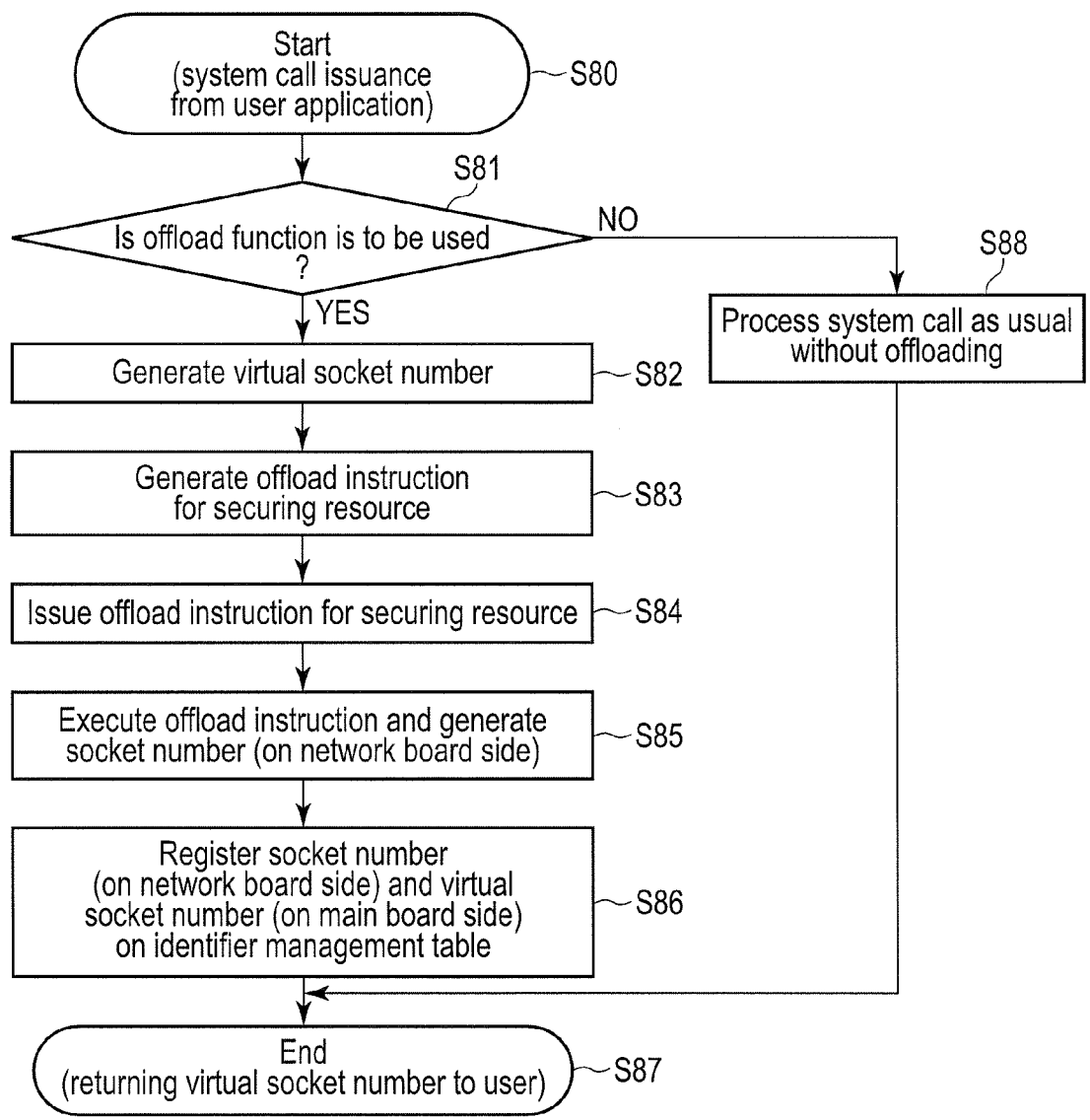
F I G. 23

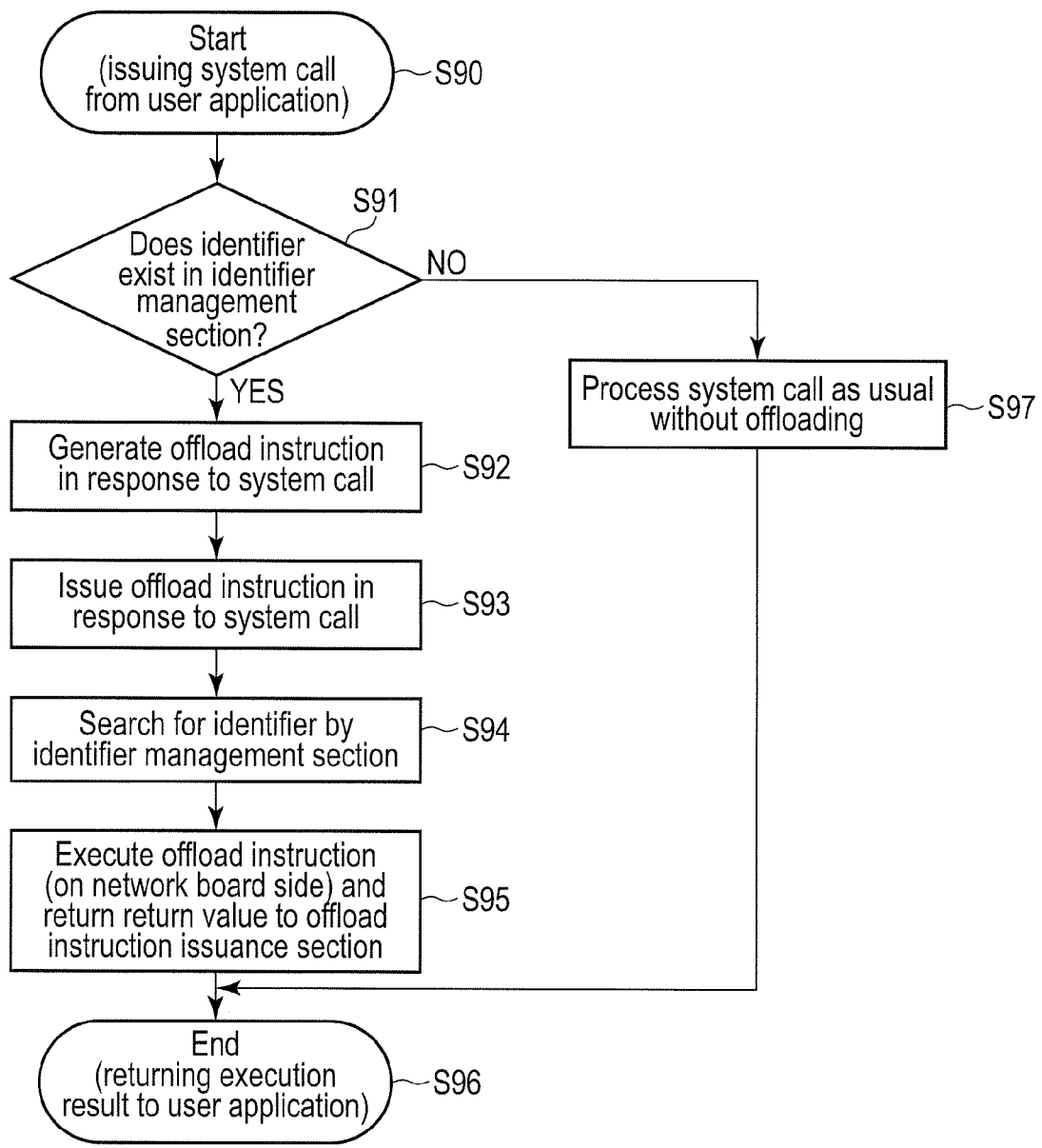
F I G. 24

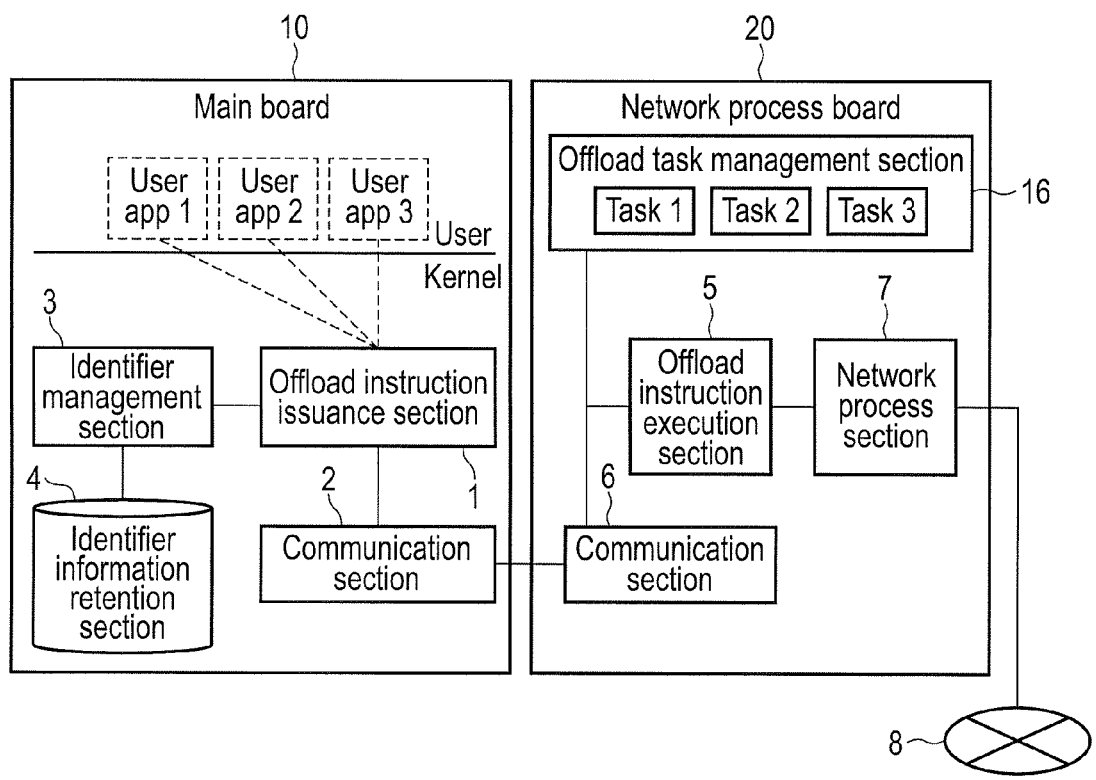
F I G. 26

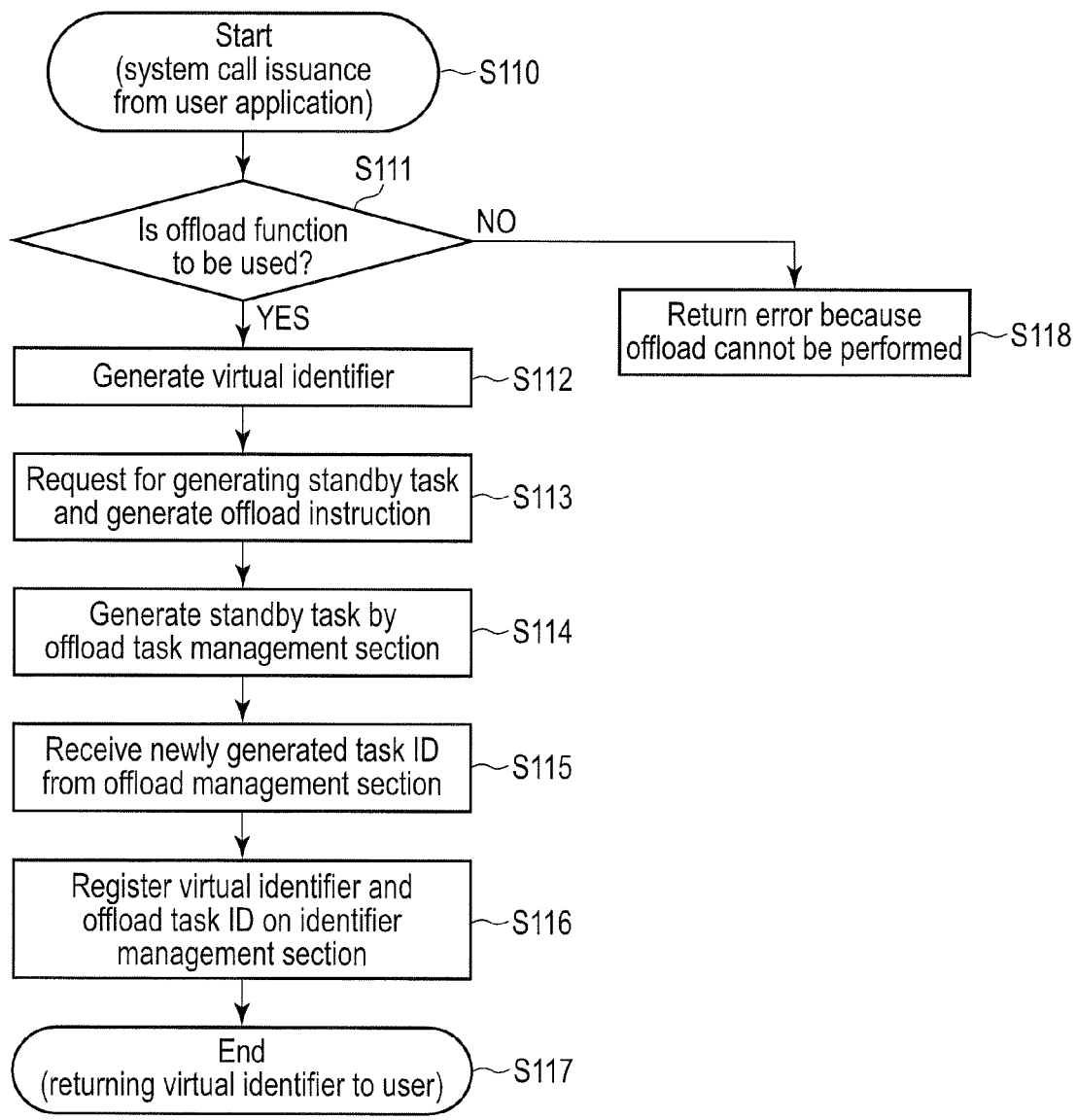
F I G. 27

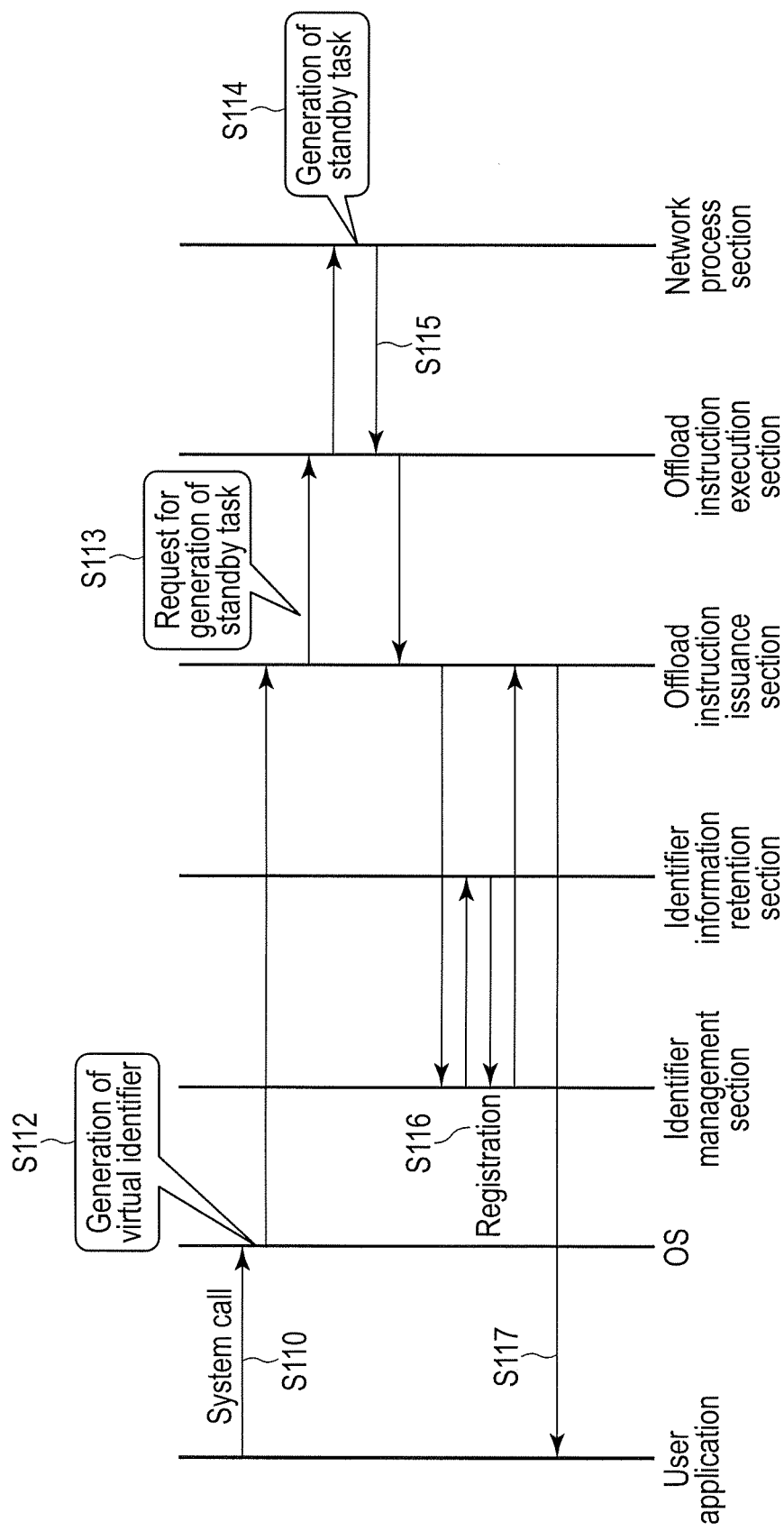
F I G. 28

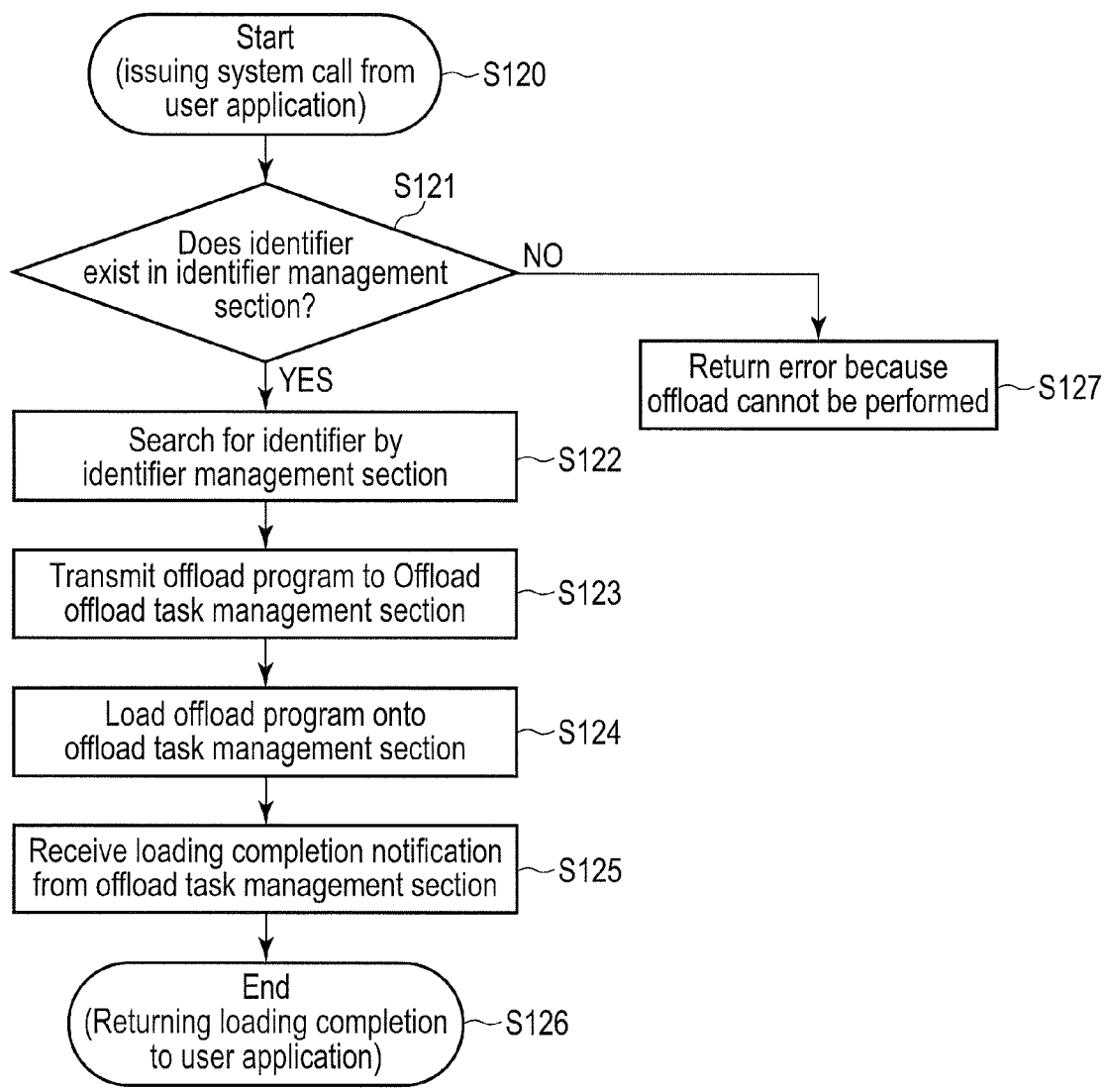
F I G. 29

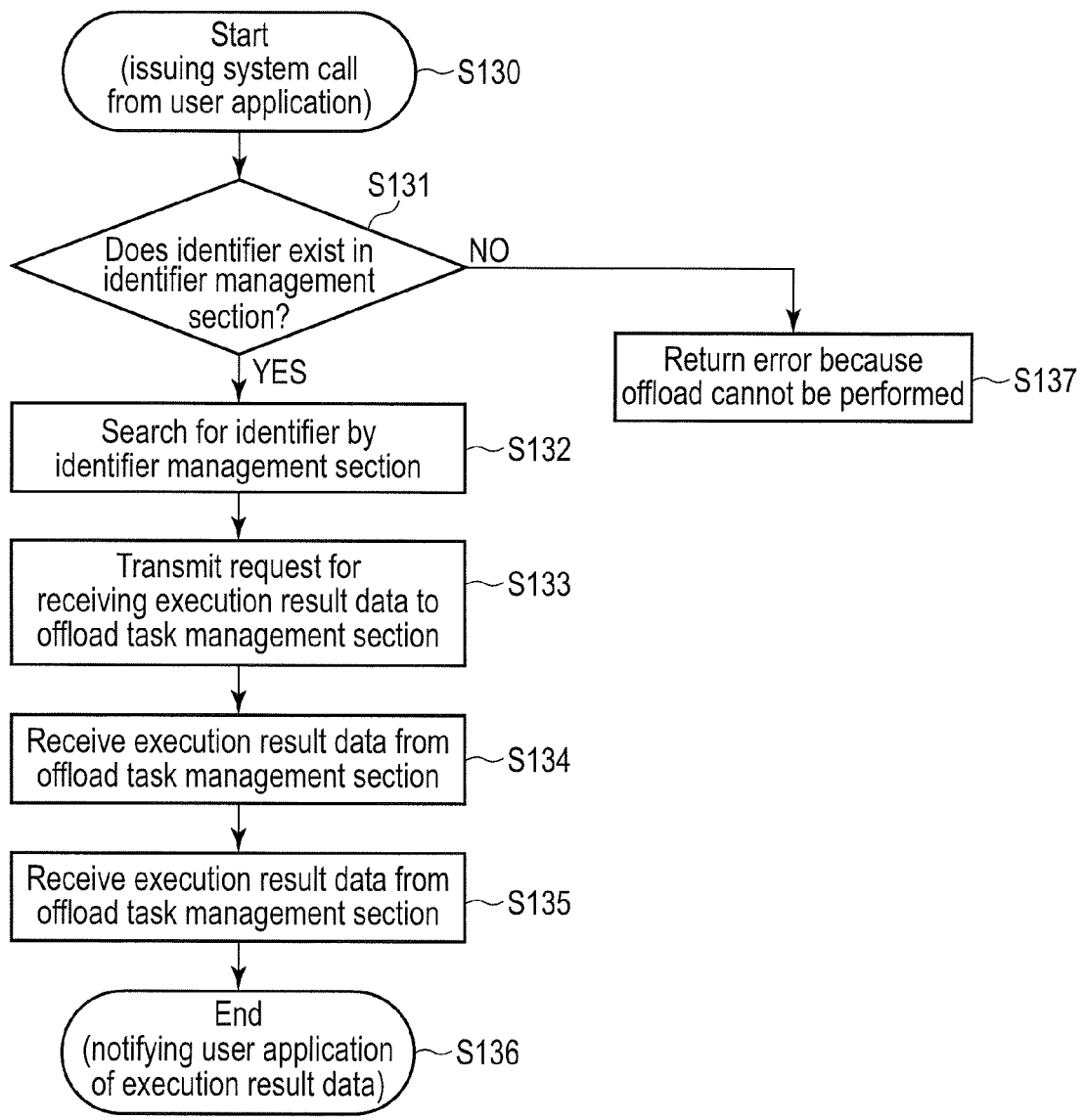
F I G. 30

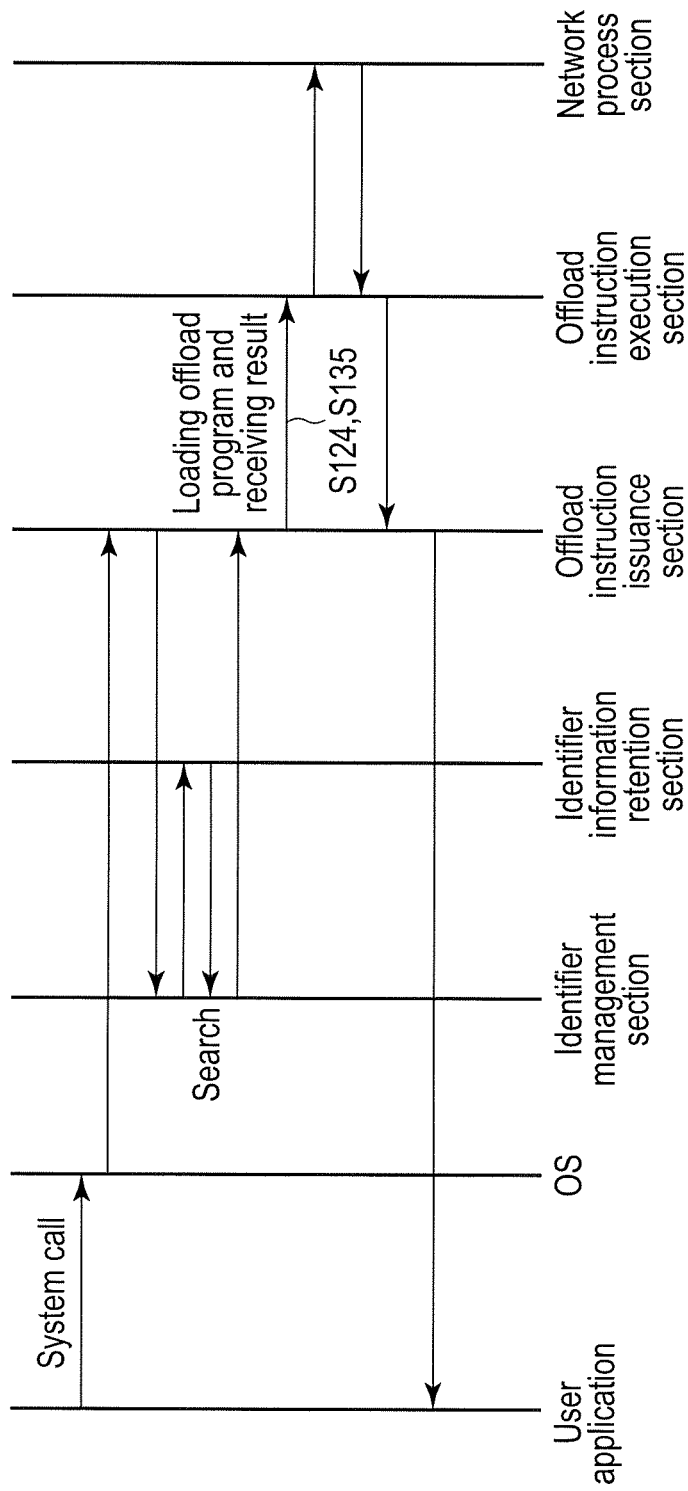
F I G. 31

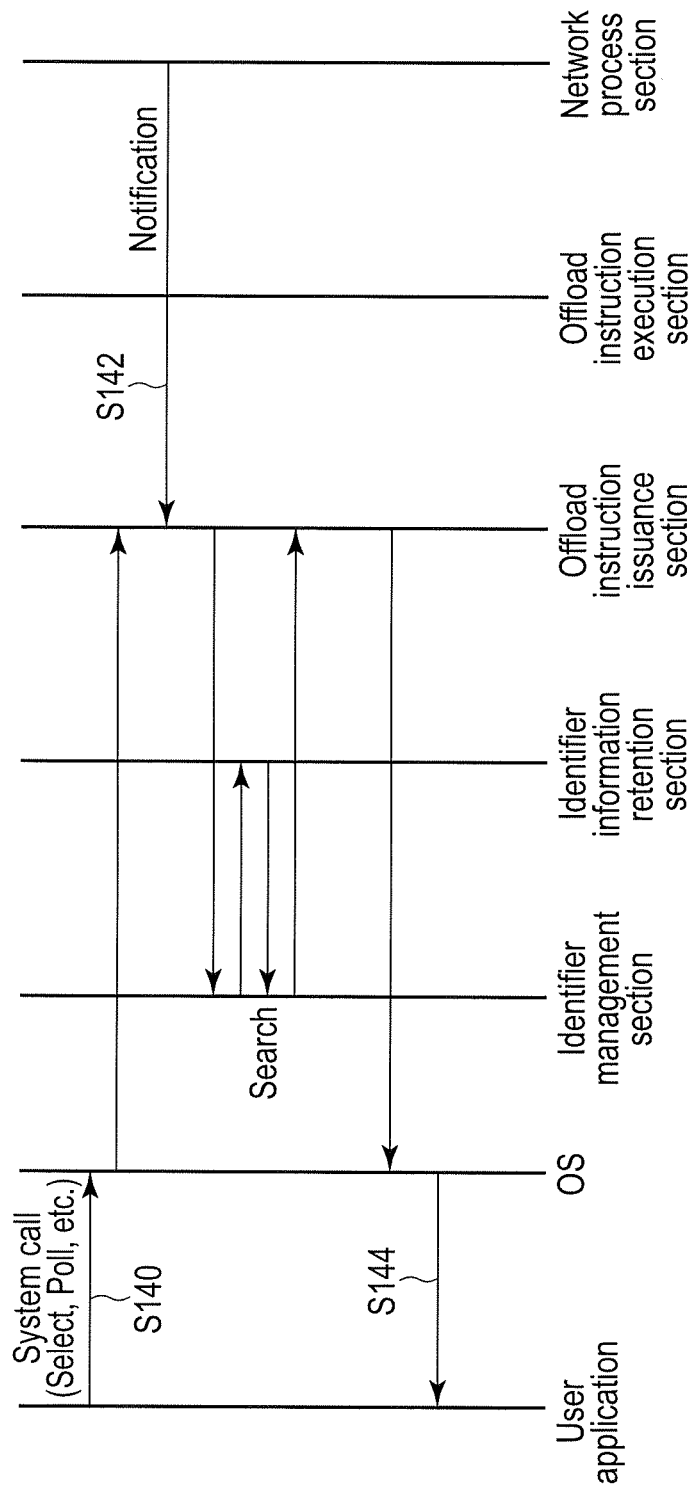
F I G. 33

INFORMATION PROCESSING APPARATUS AND INSTRUCTION OFFLOADING METHOD

CROSS-REFERENCE TO RELATED APPLICATIONS

This application is based upon and claims the benefit of priority from Japanese Patent Application No. 2012-214578, filed Sep. 27, 2012, the entire contents of which are incorporated herein by reference.

FIELD

Embodiments described herein relate generally to an information processing apparatus and a method for offloading an instruction.

BACKGROUND

In recent years, the majority of computers employ an architecture referred to as a "von Neumann computer" that includes a central processing unit (CPU) at its kernel, with a storage device such as a memory connected to the CPU. Addresses are attached to all devices accessed by the CPU so that all of those devices can be operated in an address space held by the CPU.

In expectation of reducing a load on the CPU or speeding it up, a method used often is referred to as offloading, which uses an external CPU to substitute for the processing of the CPU. Particularly, in the field of networks, the processing such as a checksum calculation of TCP/IP and a repetitive calculation of a communication protocol, such as Internet Protocol Security (IPsec), for encryption are offloaded to an external device instead of being executed by the CPU, so as to make it possible to enhance a communication speed and reduce a delay period.

However, it is rather difficult to directly access a resource held by another CPU. While changing addresses makes it possible to access all resources, a different CPU has a different address space, and therefore a conversion will be complex, making it difficult to respond to a change in architecture. Several methods exist for sharing a resource among a plurality of CPUs. Known techniques include, for example, bus bridges, remote procedure call (PRC), and memory-mapped I/O.

BRIEF DESCRIPTION OF THE DRAWINGS

FIG. 1 is a block diagram showing an information processing apparatus according to a first embodiment;

FIG. 3 is a sequence diagram showing the operation for registering the identifier according to the first embodiment;

FIG. 5 is a sequence diagram showing the operation for searching for the identifier according to the first embodiment;

FIG. 10 is a sequence diagram showing the operation for registering the identifier according to the second embodiment;

FIG. 13 is a flowchart showing an operation for deleting an identifier according to the second embodiment;

FIG. 17 is a block diagram showing an information processing apparatus according to a fourth embodiment;

FIG. 18 is a block diagram showing an information processing apparatus according to a fifth embodiment;

FIG. 20 is a sequence diagram showing the operation for searching for the identifier according to the fifth embodiment;

FIG. 23 is a flowchart showing an operation for registering an identifier according to the sixth embodiment;

FIG. 24 is a flowchart showing an operation for searching for an identifier according to the sixth embodiment;

FIG. 26 is a block diagram showing an information processing apparatus according to a seventh embodiment;

FIG. 27 is a flowchart showing an operation for registering an identifier according to the seventh embodiment;

FIG. 28 is a sequence diagram showing the operation for registering the identifier according to the seventh embodiment;

FIG. 29 is a flowchart showing an operation for loading an offload program according to the seventh embodiment;

FIG. 30 is a flowchart showing an operation for receiving an execution result according to the seventh embodiment;

FIG. 31 is a sequence diagram showing the operation for loading the offload program according to the seventh embodiment;

FIG. 33 is a sequence diagram showing the operation for receiving the update notification from the offload task management section according to the seventh embodiment;

DETAILED DESCRIPTION

Figure 2:
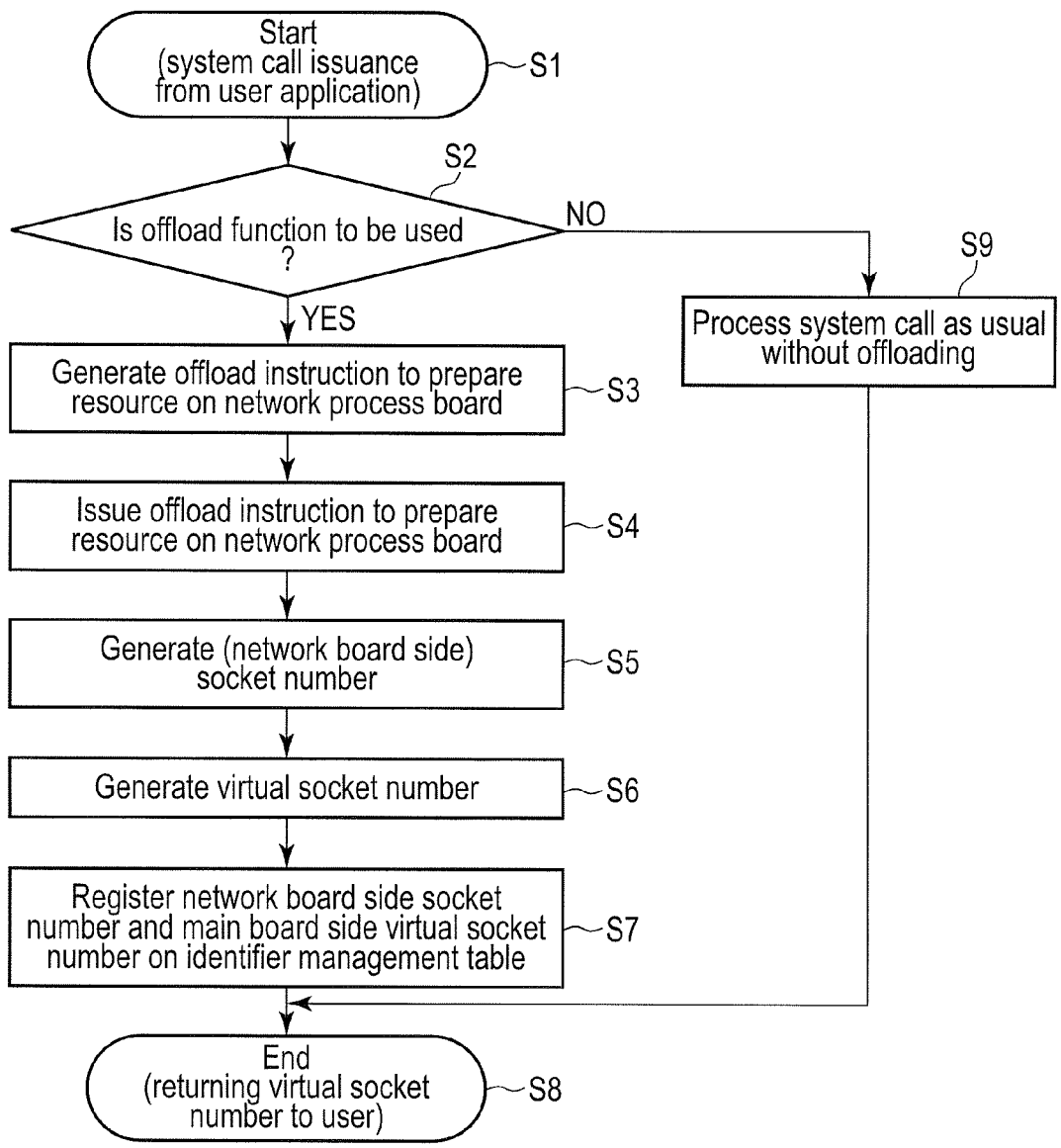
FIG. 2 is a flowchart showing an operation for registering an identifier according to the first embodiment.

In general, according to one embodiment, an information processing apparatus includes an issuer and a communicator.

The issuer issues an offload instruction corresponding to a first process executed in company with a first identifier capable of uniquely specifying a resource of a first arithmetic operation device. The communicator transmits the offload instruction to a second arithmetic operation device and receives a result of execution of the offload instruction from the second arithmetic operation device. In the second arithmetic operation device, the first identifier contained in the offload instruction is converted into a second identifier capable of uniquely specifying a resource of the second arithmetic operation device, and processing specified by the offload instruction is executed.

In the following description, embodiments are set forth with reference to the accompanying drawings.

The present embodiments each include therein an identifier management table that allows conversion of an identifier that is represented by a file descriptor and is held by a CPU on one side into an identifier held by a CPU on the other side so that the former CPU converts the identifier upon occurrence of an access, thereby realizing sharing of a resource.

An access to hardware and a specific memory area is typically protected by an operating system (OS) so that an access to such memory area by a common user application is carried out via an application programming interface (API) that is referred to as a system call provided by an OS. In this case, an identifier referred to as a file descriptor is used for providing an access while the actual address of the memory area is concealed.

The present embodiments use an identifier management table for converting an identifier correlated with a main CPU into an identifier correlated with a CPU in an offload destination, thereby enabling an application on the main CPU side to access a resource connected to the CPU in the offload destination. This configuration allows the conversion using an abstracted identifier, thereby making it possible to easily use a resource on the offload destination, without performing conversion between an address according to the main CPU and an address according to the CPU in the offload destination, the conversion that has been necessary according to a conventional technique.

First Embodiment

The first embodiment applies to a case in which a main board holds an identifier management table therein. A case in which another board such as a network process board, in place of the main board, holds the identifier management table therein is put forth in a second embodiment and thereafter. The present embodiment is applicable to both an execution of offloading from the start of a system and that of offloading from any given timing after the start of the system. Whether to start an offload process is determined according to the system call (e.g., a socket) requesting to secure a resource.

<Description of Configuration>

FIG. 1 is a block diagram showing an information processing apparatus according to the first embodiment.

A main board 10 includes therein an offload instruction issuance section 1, a communication section 2, an identifier management section 3, and an identifier information retention section 4. The offload instruction issuance section 1 converts a task assigned to the main board 10 into a form that allows processing at an offload destination and requests a network process board 20 to execute the processing for the main board. The communication section 2 performs communication with the network process board 20. The identifier information retention section 4 retains an identifier management table in which an identifier on the network process board 20 side is correlated with an identifier (e.g., a process ID, a socket number, a buffer number, or a queue number) on the main board 10 side. The identifier management section 3 performs input or output of an identifier into or from the identifier management table for registration, searching, or deletion of the identifier with respect to the identifier management table retained by the identifier information retention section 4.

The network process board 20 includes therein an offload instruction execution section 5, a network process section 7, and a communication section 6. The offload instruction execution section 5 executes a task accepted from the main board 10. The communication section 6 performs communication with the main board 10. The network process section 7 performs external communication via a network 8.

<Description of Operation>

An offload operation using the identifier management table is categorized into three procedures, that is, registration, search and deletion with respect to the identifier management table.

Registration of Identifier

FIG. 2 is a flowchart showing an operation for registering an identifier according to the first embodiment; and FIG. 3 is a sequence diagram showing the operation for registering the identifier according to the first embodiment.

Whether an offload function is to be used is determined by a user setup, a ratio of power consumption of a device to a power supply thereto, a residual battery capacity, a profile in which a pre-set power saving policy is described, whether a quick response is require of an application, whether the application performs an intermittent operation, and the like (steps S1 and S2). If the offload function is not to be used, a system call is processed as usual (step S9). Immediately after a start of using the offload function, the identifier management table retained by the identifier management section 3 is empty. The work for registering a set of identifiers including the identifier of the main board 10 and that of the network process board 20 on the identifier management table is carried out in connection with a system call with which a user application requests an OS to prepare a resource managed thereby. For example, according to Linux (a registered trademark), a socket is prepared upon issuance of a socket system call that is a system call for requesting an OS to prepare a socket. When such socket system call is issued, the main board 10 prepares a virtual socket number (i.e., a socket number for specifying a socket on a network process board), instead of actually preparing a socket (step S6). The virtual socket number is desirably a file descriptor that allows the OS to lend out in connection with a file descriptor managed by the OS. This configuration allows the user application to use an offload function without being conscious of whether the offload function is in use.

At the same time, the offload instruction issuance section 1 generates, and issues, an offload instruction with at least one or more arguments of those of the system call as arguments (steps S3 and S4). The offload instruction execution section 5 of the network process board 20 executes the offload instruction so that the offload instruction issuance section 1 receives a socket number on the network process board 20 as a return value (step S5). A set including the virtual socket number generated at the main board 10 and the socket number generated at the network process board 20 is registered on the identifier management table (step S7). In this event, if a plurality of user applications exist on the main board 10, the process IDs of them are also registered. It is noted that a return value of a system call for requesting preparation of a resource managed by the OS is defined as a virtual socket number (step S8).

Search for Identifier (Processing of Overall System Call for Communication)

Figure 4:
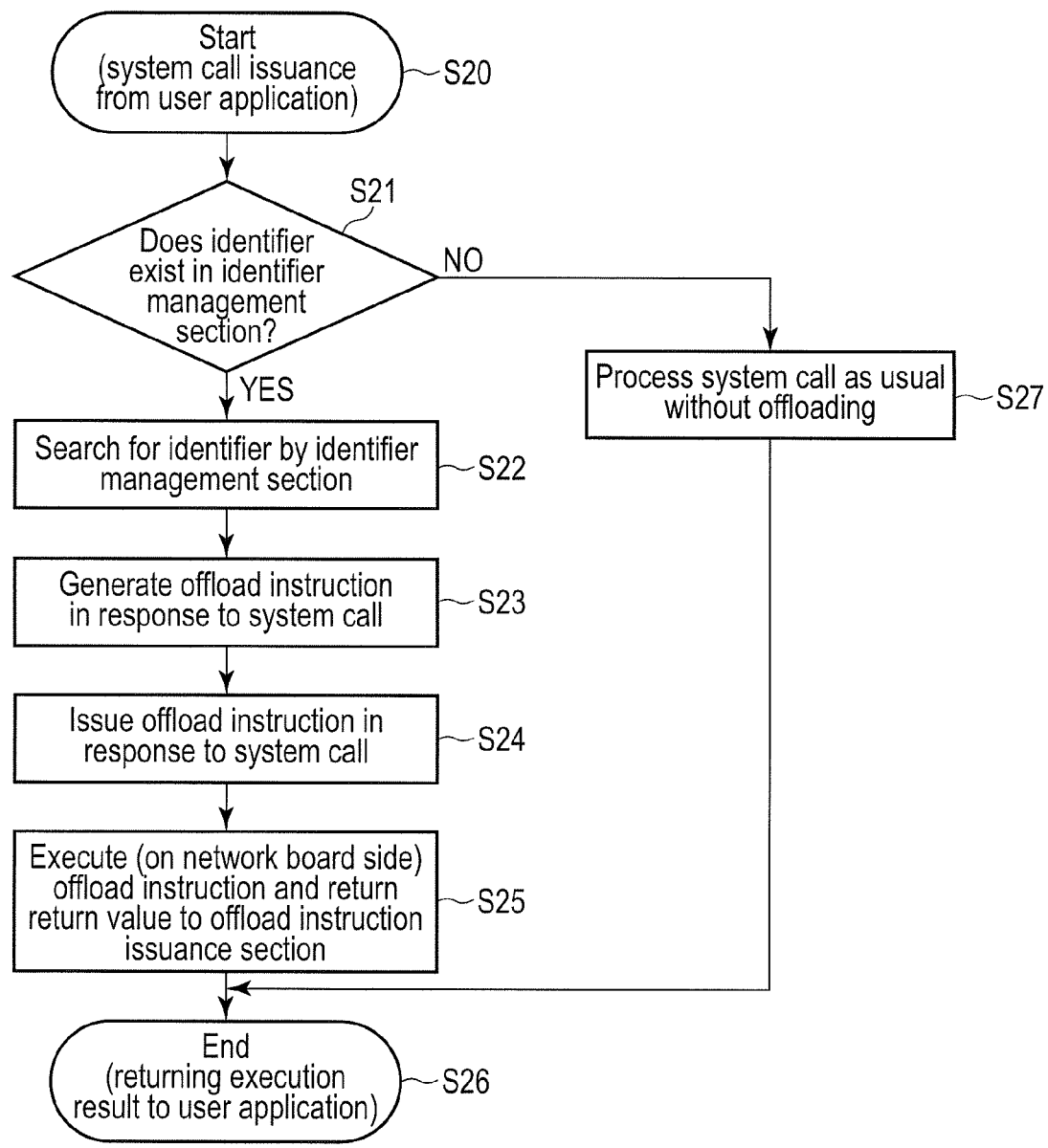
FIG. 4 is a flowchart showing an operation for searching for an identifier according to the first embodiment.

FIG. 4 is a flowchart showing an operation for searching for the identifier according to the first embodiment; and FIG. 5 is a sequence diagram showing the operation for searching for the identifier according to the first embodiment.

When an application is to perform input into or output from a resource managed by an OS, a system call is issued without exception (step S20). Examples of system calls for carrying out network-related processes include the processes related to socket operations such as bind, listen, connect, recvfrom, sendto, close, shutdown, setsockopt, getsockname, and getpeername. Whether an offload function is to be used is determined at this stage. If a socket number (or a process ID in addition to the socket number if there are a plurality of user applications) as one of arguments of the system call exists in the identifier management table, the system call can be determined to be related to the offload function (steps S21 and S22).

If the system call is determined to be related to the offload function, the offload instruction issuance section 1 generates, and issues, an offload instruction with at least one or more arguments of those other than the socket number, of system call arguments, and with a number produced by the identifier management section 3 converting the aforementioned socket number into a socket number on the network process board 20 as an argument (step S23) to request execution of the offload instruction at the network process board 20. The offload instruction issuance section 1 receives data as a return value from the offload instruction execution section 5 (step S25) and returns the data as the return value of the system call to the user application (step S26). Information that must be notified as a result of executing the offload instruction is also transmitted together to the main board. Such information includes, for example, a change in condition occurring to a communication interface and an error code at the occurrence of the error.

Deletion of Identifier

Figure 6:
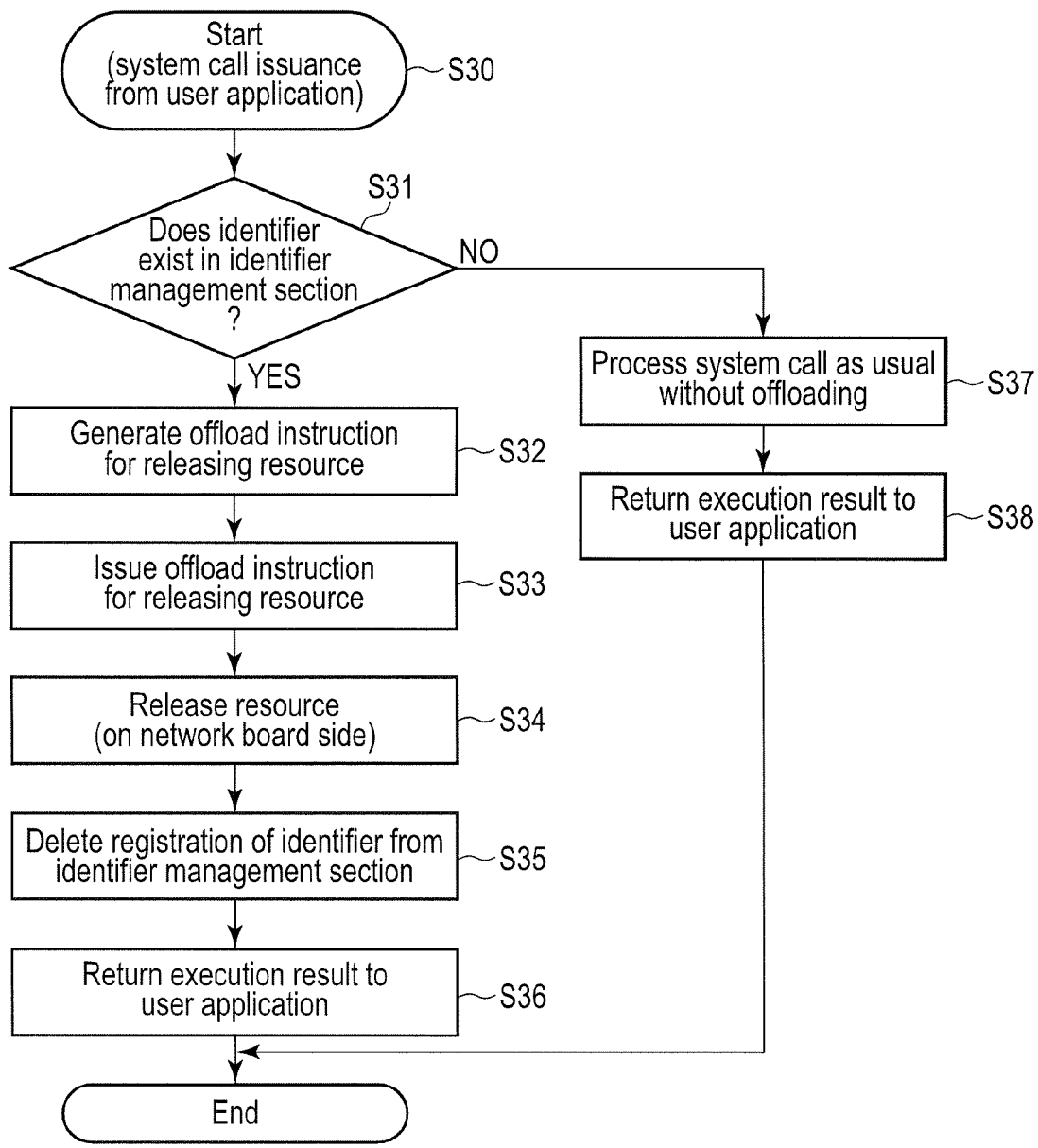
FIG. 6 is a flowchart showing an operation for deleting an identifier according to the first embodiment.
Figure 7:
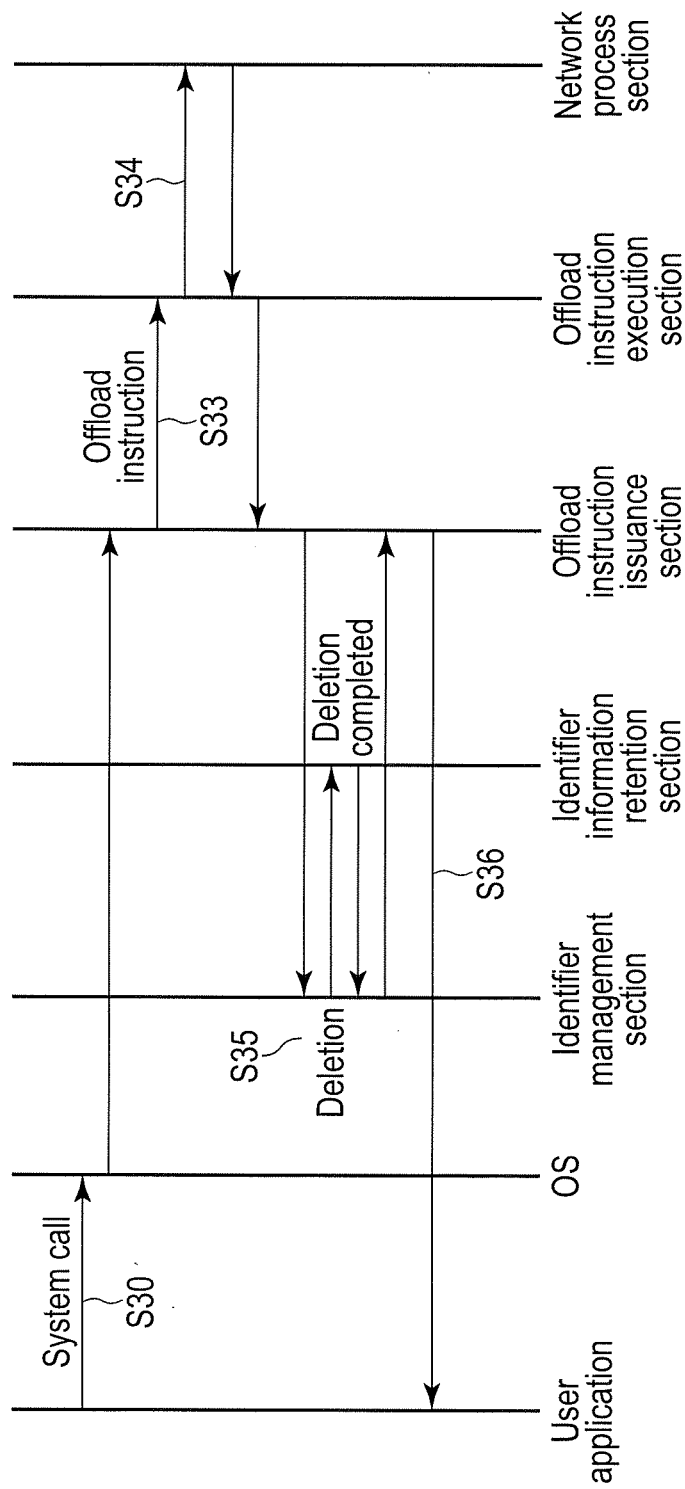
FIG. 7 is a sequence diagram showing the operation for deleting the identifier according to the first embodiment.

FIG. 6 is a flowchart showing an operation for deleting an identifier according to the first embodiment; and FIG. 7 is a sequence diagram showing the operation for deleting the identifier according to the first embodiment.

When a user application releases a resource managed by an OS, a system call is issued without exception (step S30). In this event, if a socket number that is one of arguments of the system call exists in the identifier management table, the system call can be determined to be related to the offload function. If the system call is determined to be related to the offload function, the offload instruction issuance section 1 searches the identifier management section 3 for a socket number on the network process board 20, the socket number corresponding to the socket number that exists in the identifier management table and is one of arguments of the system call (step S31). The offload instruction issuance section 1 generates an offload instruction with at least one or more arguments, of those other than a socket number of the system call, and with a socket number on the network process board 20 as an argument, the offload instruction for requesting release of a resource related to the socket (step S32), and requests the offload instruction execution section 5 of the network process board 20 to process the offload instruction (step S33). The offload instruction execution section 5 releases the applicable resource (step S34) and returns a result of the execution to the offload instruction issuance section 1. With this, the registration of the applicable identifier is deleted from the identifier information retention section 4 (step S35). The offload instruction issuance section 1 returns the result of releasing the resource as the return value of the system call, to the user application (step S36).

Second Embodiment

The second embodiment is applied to a case in which a network process board is provided with an identifier management table, and corresponds to a case in which an offload function is used immediately after starting a system. The configuration and operations of the present embodiment similar to those of the first embodiment are not described in detail in the following.

Figure 8:
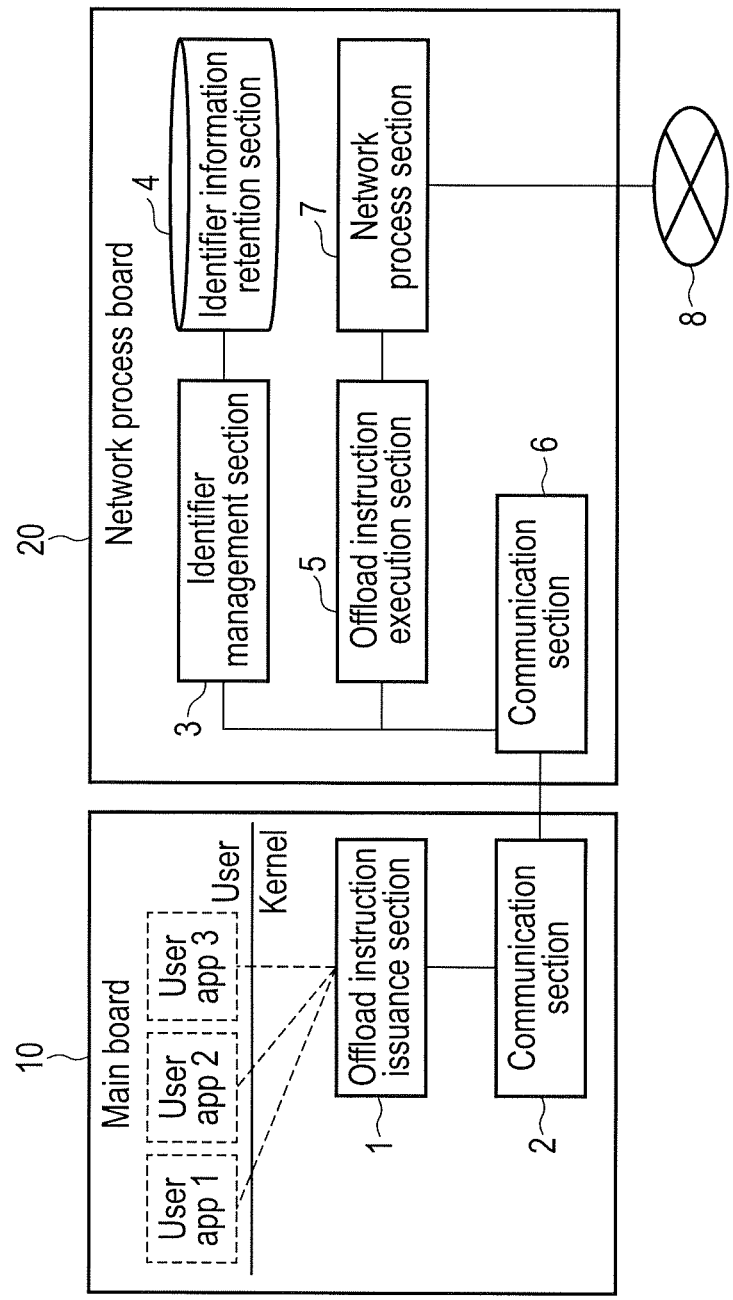
FIG. 8 is a block diagram showing an information processing apparatus according to a second embodiment.

FIG. 8 is a block diagram showing an information processing apparatus according to a second embodiment.

<Description of Configuration>

A main board 10 includes therein an offload instruction issuance section 1 and a communication section 2. The offload instruction issuance section 1 converts a task assigned to the main board 10 into a form that allows processing at an offload destination and requests the network process board 20 to process such for the main board. The communication section 2 performs communication with the network process board 20.

The network process board 20 includes therein an offload instruction execution section 5, a network process section 7, a communication section 6, an identifier management section 3, and an identifier information retention section 4. The offload instruction execution section 5 executes a task accepted from the main board 10. The communication section 6 performs communication with the main board 10. The network process section 7 performs external communication via a network 8. The identifier information retention section 4 retains an identifier management table in which an identifier on the network process board 20 side is correlated with an identifier (e.g., a process ID, a socket number, a buffer number, or a queue number) on the main board 10 side. The identifier management section 3 performs input or output of an identifier into or from the identifier management table for registration, searching, or deletion of the identifier with respect to the identifier management table retained by the identifier information retention section 4.

<Description of Operation>

An offload operation using the identifier management table is categorized into three procedures, that is, registration, search, and deletion with respect to the identifier management table.

Registration of Identifier

Figure 9:
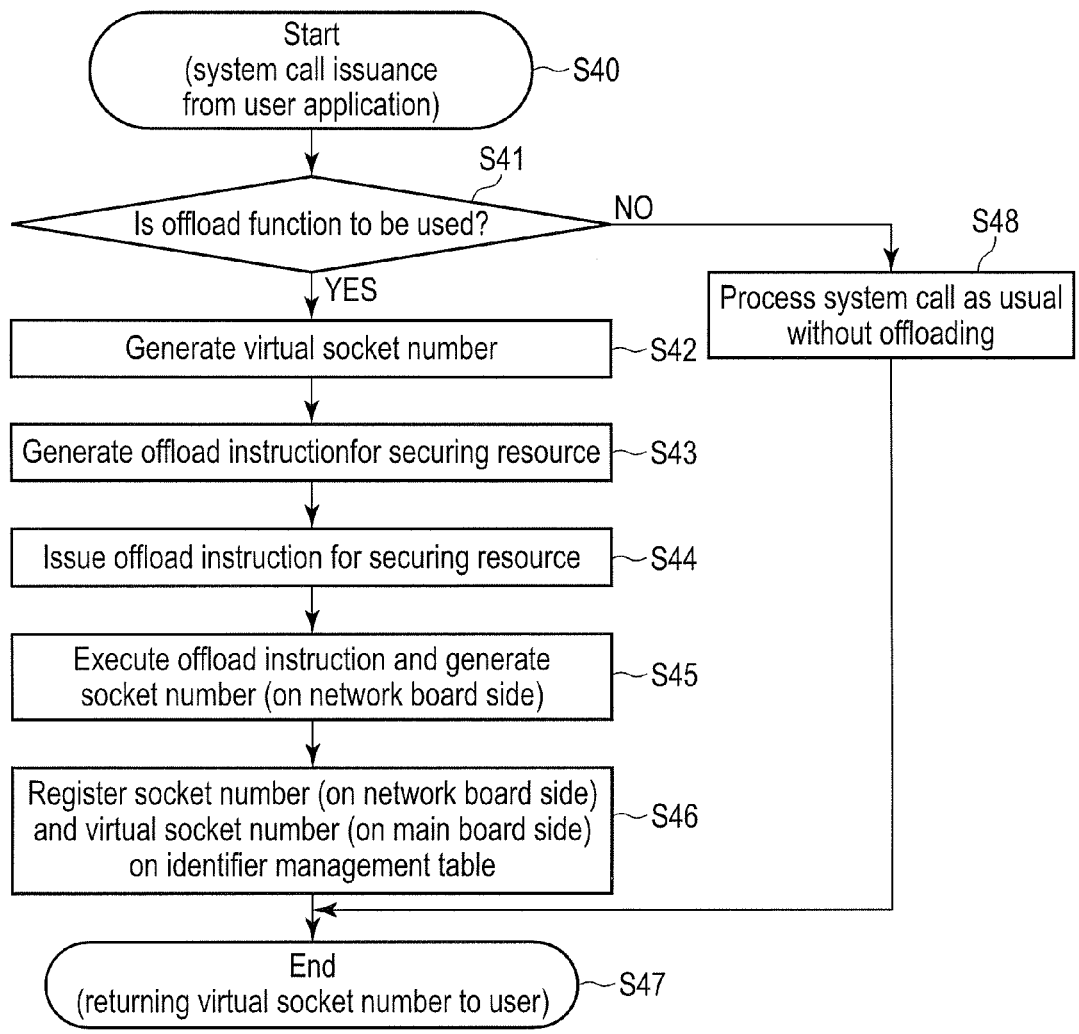
FIG. 9 is a flowchart showing an operation for registering an identifier according to the second embodiment.

FIG. 9 is a flowchart showing an operation for registering an identifier according to the second embodiment; and FIG. 10 is a sequence diagram showing the operation for registering the identifier according to the second embodiment.

Whether an offload function is to be used is determined by a user setup, the power consumption of a device and the condition of a power supply thereto, a preset profile, the category of user application, and the like (steps S40 and S41). If the offload function is not used, a system call is processed as usual (step 48). Immediately after a start of using the offload function, the identifier management table retained by the identifier management section 3 is empty. The work for registering a set of identifiers including the identifier of the main board 10 and that of the network process board 20 on the identifier management table is carried out in connection with a system call with which a user application requests an OS to prepare a resource managed thereby (step S40). For example, according to Linux, a socket is prepared upon issuance of a socket system call that is a system call for requesting an OS to prepare a socket. When the socket system call is issued, the main board 10 prepares a number (a virtual socket number) to be lent out, of consecutive numbers to be attached respectively to other identifiers, instead of actually preparing a socket (step S42).

At the same time, the offload instruction issuance section 1 generates, and issues, an offload instruction with at least one or more arguments, of those of the system call, and with the virtual socket number as an argument (steps S43 and S44). The offload instruction execution section 5 of the network process board 20 executes the offload instruction (step S45). With this, a socket number is generated. The identifier management section 3 registers a set of numbers on the identifier management table, the numbers including the virtual socket number generated at the main board 10 and the socket number generated at the network process board 20 (step S46). In this event, if a plurality of user applications exist on the main board 10, the identifier management section 3 also registers the process IDs of them. It is to be noted that a return value of a system call for requesting preparation of a resource managed by the OS is defined as a virtual socket (step S47).

Search for Identifier (Processing of Overall System Call for Communication)

Figure 11:
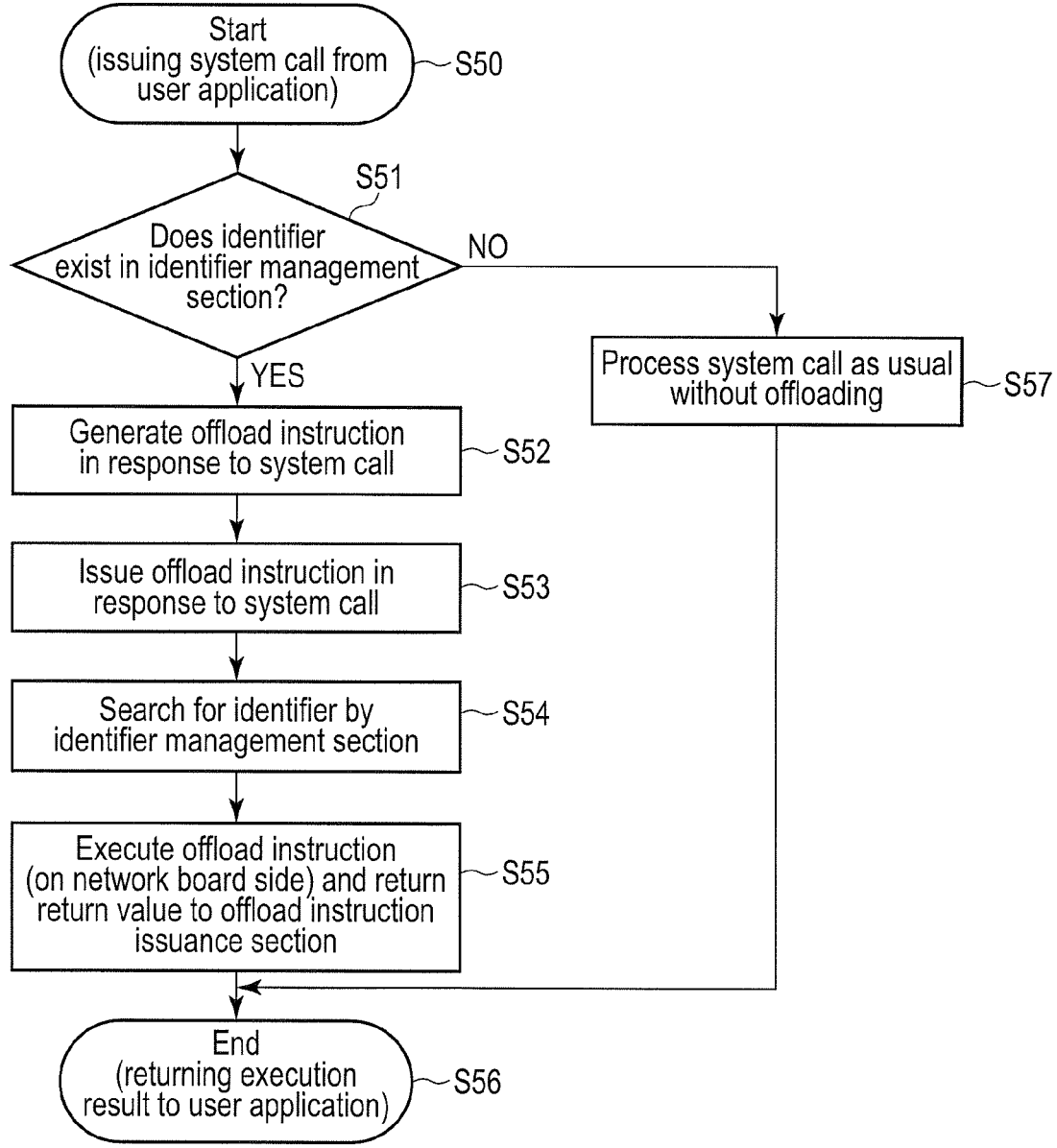
FIG. 11 is a flowchart showing an operation for searching for an identifier according to the second embodiment.
Figure 12:
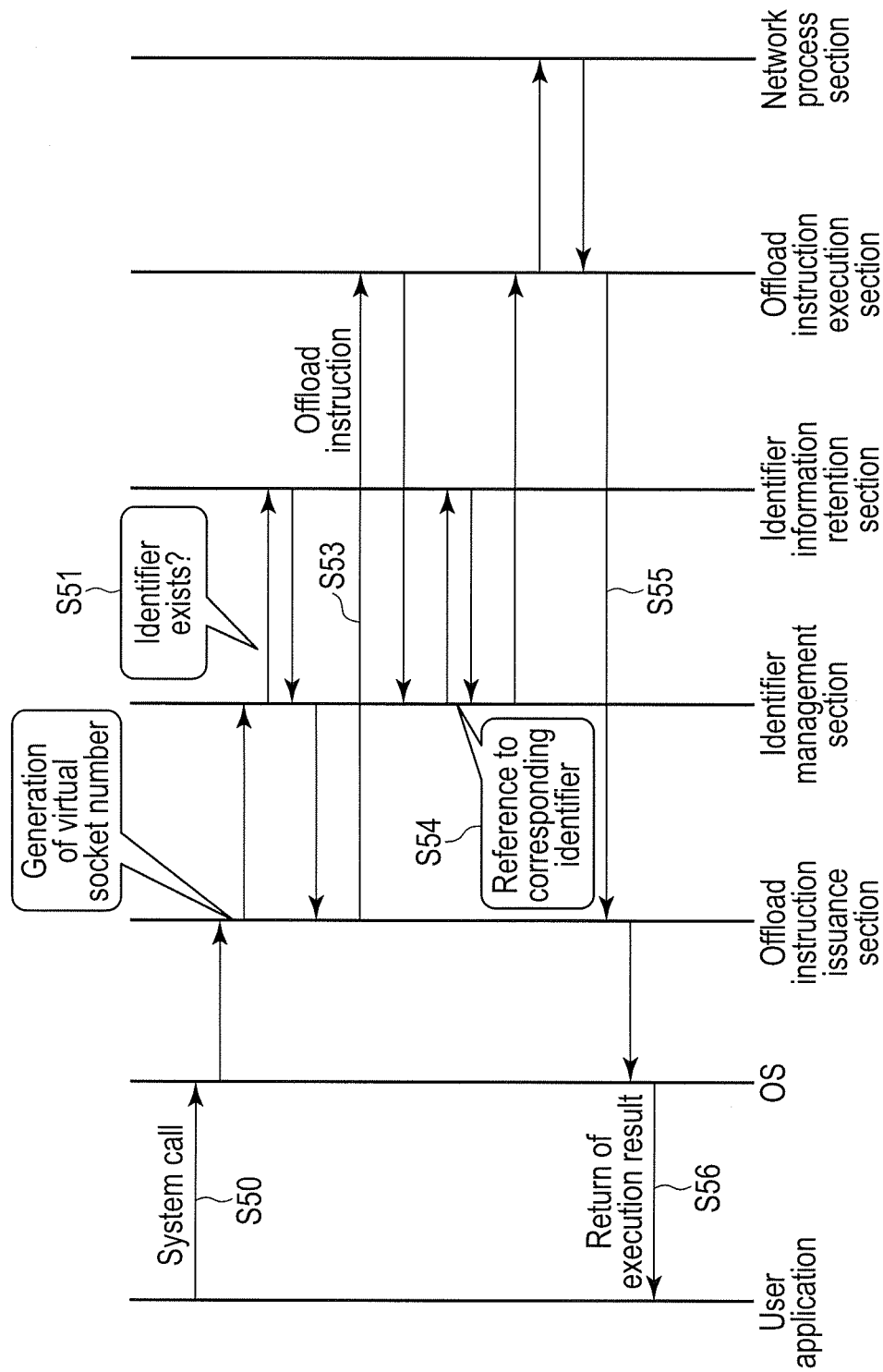
FIG. 12 is a sequence diagram showing the operation for searching for the identifier according to the second embodiment.

FIG. 11 is a flowchart showing an operation for searching for the identifier according to the second embodiment; and FIG. 12 is a sequence diagram showing the operation for searching for the identifier according to the second embodiment.

When an application is to perform input into or output from a resource managed by an OS, a system call is issued without exception (step S50). Examples of system calls for performing network-related processes include the processes related to socket operations such as bind, listen, connect, recvfrom, sendto, close, shutdown, setsockopt, getsockname, and getpeername. Whether an offload function is to be used is determined at this stage. If a socket number handed over to the OS as an argument of the system call is registered in the identifier management section 3 of the network process board 20, the system call can be determined to be related to an offload (step S51).

If the system call is determined to be related to an offload function, the offload instruction issuance section 1 generates, and issues, an offload instruction with the socket number and at least one or more arguments of other arguments, of system call arguments (step S52) to request execution at the network process board 20 (step S53). Here, the socket number is the virtual socket number described above.

The identifier management section 3 of the network process board 20 searches the identifier information retention section 4 for an identifier on the network process board 20 side, the identifier corresponding to the virtual socket number (the identifier). The offload instruction execution section 5 uses the retrieved identifier to execute the offload instruction and returns a result of the execution to the offload instruction issuance section 1 of the main board 10 (step S55). The offload instruction issuance section 1 returns the execution result received from the offload instruction execution section 5 to the user application as the return value of the system call (step S56).

Deletion of Identifier

Figure 14:
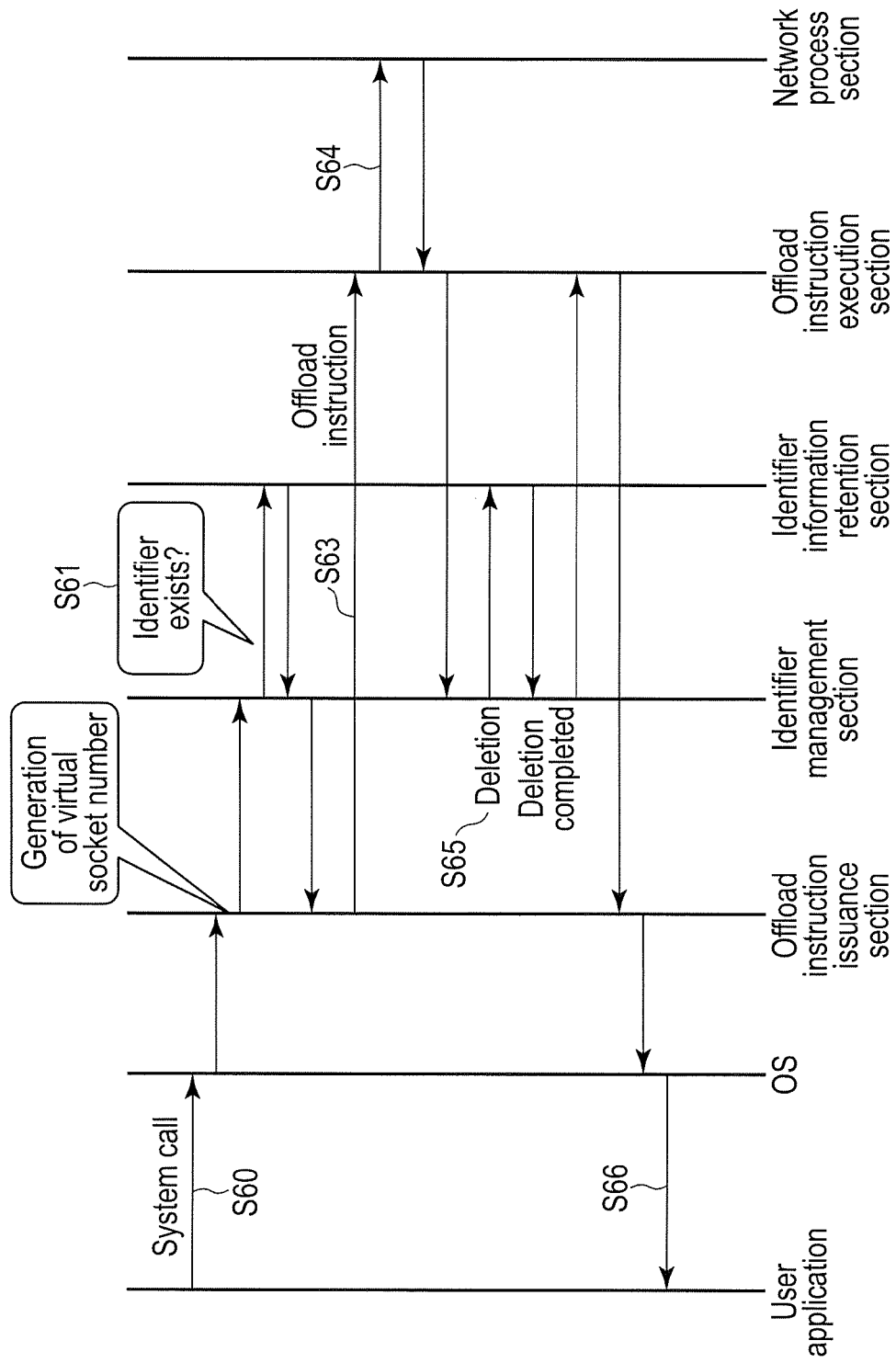
FIG. 14 is a sequence diagram showing the operation for deleting the identifier according to the second embodiment.

FIG. 13 is a flowchart showing an operation for deleting an identifier according to the second embodiment; and FIG. 14 is a sequence diagram showing the operation for deleting the identifier according to the second embodiment.

When a user application releases a resource managed by an OS, a system call is issued without exception (step S60). In this event, if a socket number (or a process ID in addition to the socket number if there is a plurality of user applications) that is one of arguments of the system call exists in the identifier management table, the system call can be determined to be related to the offload function (step S61). If the system call is determined to be related to the offload function, the offload instruction issuance section 1 searches for a socket number on the network process board 20, via the identifier management section 3 of the network process board 20, the socket number corresponding to the socket number that is one of arguments of the system call. The offload instruction issuance section 1 generates an offload instruction with at least one or more arguments, of those other than the socket number of the system call, and with a socket number on the network process board 20 as an argument, the offload instruction for requesting release of a resource related to the socket (step S62), thereby requesting the offload instruction execution section 5 of the network process board 20 to execute the offload instruction (step S63). The offload instruction execution section 5 releases the applicable resource (step S64) and returns a result of the execution to the offload instruction issuance section 1. Also, the offload instruction execution section 5 deletes the registration of the applicable identifier from the identifier information retention section 4 (step S65). The offload instruction issuance section 1 returns the result of releasing the resource to the user application as the return value of the system call (step S66).

Third Embodiment

The third embodiment is configured to determine a storage process board to be an offload destination.

The configuration and operations of the present embodiment similar to those of the first embodiment are not described in detail in the following.

<Description of Configuration>

Figure 15:
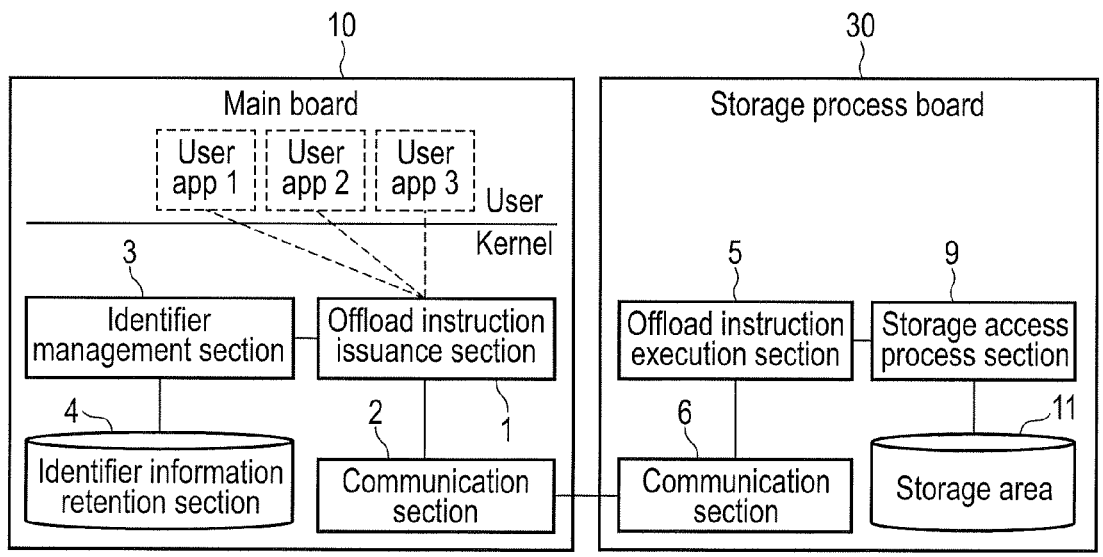
FIG. 15 is a block diagram showing an information processing apparatus according to a third embodiment.

FIG. 15 is a block diagram showing an information processing apparatus according to the third embodiment.

A main board 10 includes therein an offload instruction issuance section 1, an identifier management section 3, an identifier information retention section 4, and a communication section 2. The offload instruction issuance section 1 converts a task assigned to the main board 10 into a form that allows processing at an offload destination and requests a storage process board 30 to execute the processing for the main board. The communication section 2 performs communication with the storage process board 30. The identifier information retention section 4 retains an identifier management table in which an identifier on the storage process board 30 side is correlated with an identifier (e.g., a process ID, and a file number) on the main board 10 side. The identifier management section 3 performs input or output of an identifier into or from the identifier management table for registration, searching, or deletion of the identifier with respect to the identifier management table retained by the identifier information retention section 4.

The storage process board 30 includes therein an offload instruction execution section 5, a storage access process section 9, a communication section 6, and a storage area 11. The offload instruction execution section 5 executes a task accepted from the main board 10. The communication section 6 performs communication with the main board 10.

The storage access process section 9 takes charge of input into or output from the storage area 11. The storage area 11 is a storage device capable of retaining data. The storage area 11 may be a network storage unit such as a network file system (NFS) and an Internet small computer system interface (iSCSI), or a storage incorporated in the storage process board 30.

Figure 16:
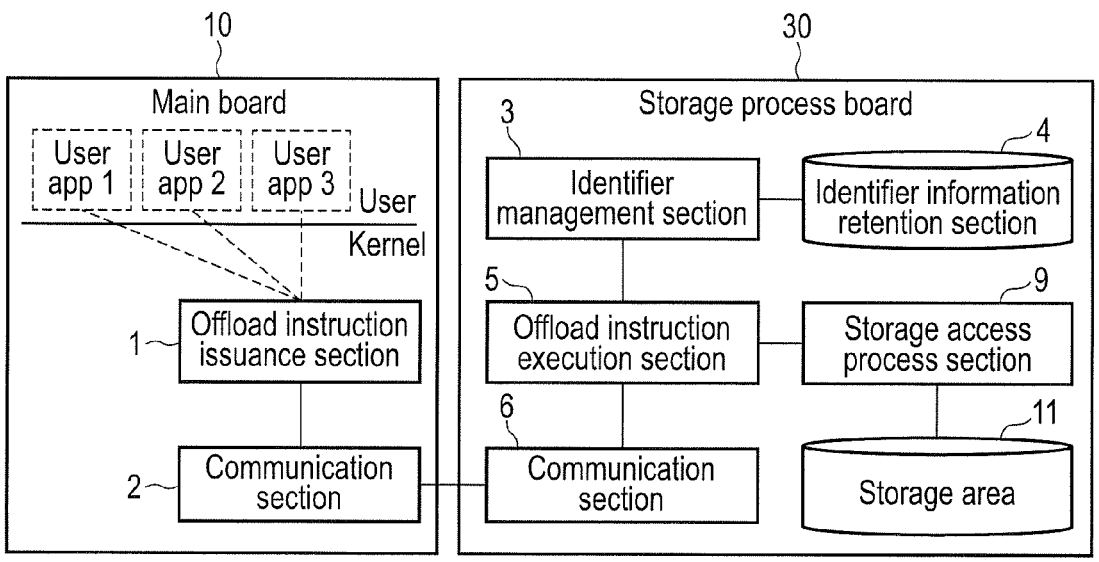
FIG. 16 is a block diagram showing another exemplary configuration of the information processing apparatus according to the third embodiment.

The configuration shown in FIG. 15 includes therein both the identifier management section 3 and the identifier information retention section 4 disposed in the main board 10. Both of them, however, may be disposed in an offload destination as in the configuration of the second embodiment. In such case, the identifier management section 3 and the identifier information retention section 4 are disposed in the storage process board 30 as shown in FIG. 16.

<Description of Operation>

An offload operation using the identifier management table is categorized into three procedures, that is, registration, search, and deletion with respect to the identifier management table.

Registration of Identifier

Whether an offload function is to be used is determined by a user setup, the power consumption of a device and the condition of a power supply thereto, a preset profile, the category of user application, and the like. Immediately after a start of using the offload function, the identifier management table retained by the identifier management section 3 is empty. The work for registering a set of identifiers on the identifier management table, the identifiers including the identifier of the main board 10 and that of the storage process board 30, is carried out in connection with a system call with which a user application requests an OS to open or close a file managed thereby. For example, according to Linux, when a file is to be accessed, an open system call is issued, and the system call for opening the file is requested to the OS. When the open system call is issued, the main board 10 prepares a number (a virtual file number) consecutive to numbers to be lent out by the OS to other identifiers. At the same time, the offload instruction issuance section 1 issues an offload instruction that contains positional information for specifying a position of the file and requests for opening the file. The offload instruction execution section 5 of the storage process board 30 opens the file and then returns the file number on the storage process board 30 as a return value to the offload instruction issuance section 1. The identifier management section 3 registers, on the identifier management table, a set of thus obtained file number of the storage process board 30 and the virtual file number generated at the main board 10. If a plurality of user applications exist on the main board 10, the process IDs of the user applications are also registered in this event. It is noted that a return value of a system call with which an application requests the OS to open a file is defined as a virtual socket number.

Search for Identifier (Processing of Overall System Call for Storage Access)

When a user application writes to or reads a file managed by an OS, a system call is issued without exception. For example, as regards a file operation under Linux, a read, write, or the like is issued. Whether an offload function is to be used is determined in this event. If a file number (or a process ID in addition to the file number if there are a plurality of user applications) that is handed over to the OS as an argument of the system call is registered in the identifier management section 3, the system call can be determined to be related to an offload function. If the system call is determined to be related to the offload function, the offload instruction issuance section 1 generates an offload instruction with one or more arguments of those other than file numbers, of system call arguments, and with a number produced by the identifier management section 3 converting the file number into a file number on the storage process board 30 as an argument, thereby requesting execution at the network process board 20. The offload instruction issuance section 1 receives data as a return value from the offload instruction execution section 5 and returns the data to the user application as the return value of the system call.

Deletion of Identifier

When the user application is to close a file managed by an OS, a system call is issued without exception. In this event, if a file number that is one of arguments of the system call exists in the identifier management table, the system call can be determined to be related to an offload function. If the system call is determined to be related to the offload function, the offload instruction issuance section 1 searches the identifier management section 3 for a file number on the storage process board 30, the file number corresponding to the file number that is one of the arguments of the system call. The offload instruction issuance section 1 generates an offload instruction with at least one or more arguments of those other than the file number of the system call and with the file number on the storage process board 30 as an argument and with which an operation of closing the file is requested, the offload instruction for requesting an operation for closing the file, thereby requesting the offload instruction execution section 5 for processing. The offload instruction execution section 5 returns data of a result of the execution to the offload instruction issuance section 1 so as to return the data to the user application as the return value of the system call.

Fourth Embodiment

The fourth embodiment is applicable to a case in which a network process board 20 is specified as an offload destination depending on the operation mode and is configured to enable switchover of a communication interface (I/F) for a wire-line LAN, a wireless LAN and the like. An identifier retained by an identifier management section 3 is for use in management of a resource in an abstract layer, and therefore the identifier is not limited to a specific physical layer. Therefore, even if communication I/Fs in a lower layer of a network process section 7 are switched over, an application program itself is not necessarily changed in accordance with the changeover, and thereby the program can be simplified.

The configuration and operations of the present embodiment similar to those of the first embodiment are not described in detail in the following.

<Description of Configuration>

FIG. 17 is a block diagram showing an information processing apparatus according to the fourth embodiment.

A main board 10 includes therein an offload instruction issuance section 1, a communication section 2, an identifier management section 3, and an identifier information retention section 4. The offload instruction issuance section 1 converts a task assigned to the main board 10 into a form that allows processing at an offload destination and requests the network process board 20 to execute the processing for the main board. The communication section 2 performs communication with the network process board 20. The identifier information retention section 4 retains an identifier management table in which an identifier on the network process board 20 side is correlated with an identifier (e.g., a process ID, a socket number, a buffer number, or a queue number) on the main board 10 side. The identifier management section 3 performs input or output of an identifier into or from the identifier management table for registration, searching, or deletion of the identifier with respect to the identifier management table retained by the identifier information retention section 4.

The network process board 20 includes therein an offload instruction execution section 5, a network process section 7, a communication section 6, and an operation mode storage section 12. The offload instruction execution section 5 executes a task accepted from the main board 10. The communication section 6 performs communication with the main board 10.

The network process section 7 is configured to communicate with the outside via a network 8 and internally includes a plurality of interfaces (I/Fs). The network process section 7 includes therein, for example, a low-power consumption wireless I/F 13, a high-speed wireless I/F 14, and a wire-line I/F 15.

<Description of Operation>

Basic operations using an offload function (i.e., registration, search, or deletion with respect to the identifier management section 3) are similar to the case of the embodiments described above. The differences are described in the following.

The offload instruction execution section 5 confirms and changes operation statuses by way of a change of interfaces, a timer-interrupt and the like, which occur in the network process section 7. The operation statuses are represented by parameters such as the On/Off status of each individual communication interface, a link-up/link-down status, the data rate and power consumption of an individual communication interface, a packet loss ratio, a response delay period, and a communication speed.

An operation mode is pre-set by a user, thereafter dynamically changed, and retained in the operation mode storage section 12. The operation modes include, for example, a low-power consumption mode for suppressing power consumption during communication, a low-delay mode for minimizing a delay period and a high-throughput mode for maximizing a throughput. For example, if the low-power consumption mode is set in the state of using high-speed wireless communication, the offload instruction execution section 5 checks a communication interface that is linked up, and switches over to the communication interface (e.g., the low-power consumption wireless I/F 13) if it is possible.

Fifth Embodiment

The fifth embodiment is applicable to a case in which a network process board 20 is designated as an offload destination and is adapted to enable switchover of layers of a communication protocol and network buffers.

In the case of allowing the layers of a socket to be changed during usage of the network 8, a new system call is defined for setting the change of layers for a socket that is in offload. For example, if a new system call is defined when the socket in offload has been engaged in TCP communication, the communication is permitted to perform in an Ethernet (a Registered Trademark) layer that is a lower layer. The present embodiment is configured to change the layers by issuing a new system call, thereby making it possible to perform communication in the lower layer by using the socket of the TCP communication as is, the socket that has been used prior to the issuance of the new system call. The switchover of the layers of a communication protocol makes it possible to switch to, for example, Ethernet to obtain an Ethernet frame, thereby obtaining communication contents in the lower layers including a media access control (MAC) address.

Similarly to the case of the communication protocol layer, network buffers (i.e., queues) at an offload destination may be switched over. The configuration and operations of the present embodiment are described by exemplifying the aforementioned case. In the case of allowing change of queues when the network 8 is in use, a new system call is defined for setting the change of queues that are in offload.

FIG. 18 is a block diagram showing an information processing apparatus according to the fifth embodiment. Configuration and operation of the present embodiment similar to those of the first embodiment are not described in detail in the following.

<Description of Configuration>

The configuration of a main board 10 is similar to that of the first embodiment. While the configuration of the network process board 20 is approximately the same as that of the first embodiment, the difference therefrom is that the network process board 20 has a network process section 7 provided with a plurality of queues (e.g., queue 1 through queue 4) corresponding to a plurality of sockets and that the queues can be changed by a new system call. This configuration makes it possible to instantly change over quality of service (QoS) queues and protocol categories, enabling reduction in a delay period of time.

<Description of Operation>

Figure 19:
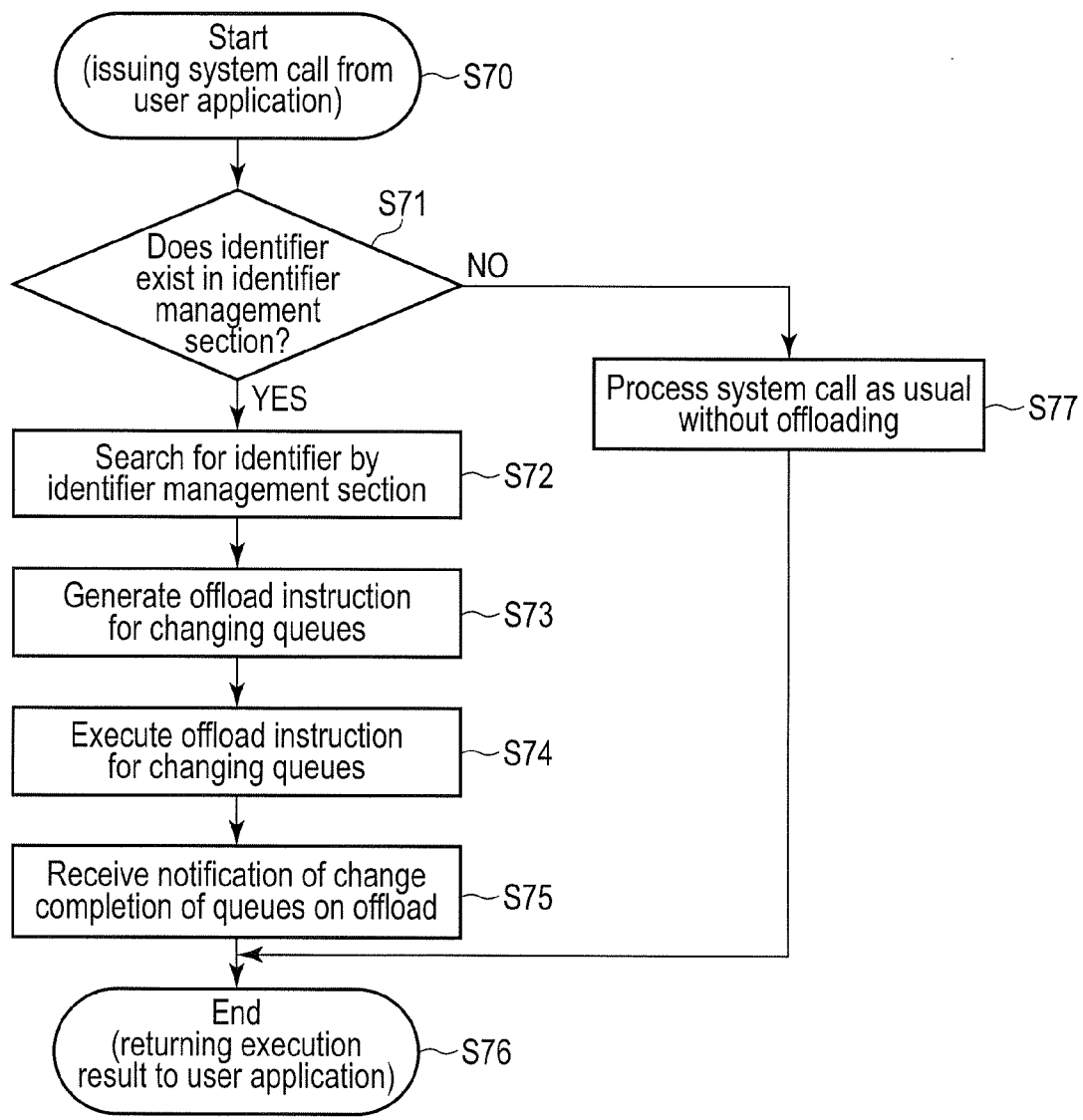
FIG. 19 is a flowchart showing an operation for searching for an identifier according to the fifth embodiment.

FIG. 19 is a flowchart showing an operation for searching for an identifier according to the fifth embodiment; and FIG. 20 is a sequence diagram showing the operation for searching for the identifier according to the fifth embodiment.

Basic operations of registration, usage, and deletion at an identifier management section 3 are similar to the case of the first embodiment. The contents of changes are described in the following.

A new system call is defined for changing queues being in offload. Upon issuance of the system call (step S70), the offload instruction issuance section 1 searches for whether a specified virtual socket number is registered in the identifier management section 3 and whether an identifier on the corresponding network process board 20 exists (step S71). The offload instruction issuance section 1 transmits, to the offload instruction execution section 5, an instruction that contains the checked identifier on the network process board 20 as an argument (steps S72 and S73). If the applicable socket is in use and if a queue corresponding to the specified queue exists, the offload instruction execution section 5 returns the queue number to the offload instruction issuance section 1 (step S74). The offload instruction issuance section 1 receives a notification that the change of queues is complete (step S75) and notifies the user application of the received notification (step S76).

Sixth Embodiment

The sixth embodiment relates to a simultaneous use of two offload processes. The present embodiment is applicable to a case in which a network process board 20 and a storage process board 30 are designated as offload destinations, or a case in which an offload process board capable of performing both a network process and a storage process is constituted. The configuration and operations of the present embodiment similar to those of the first embodiment are not described in detail in the following.

<Description of Configuration>

Figure 21:
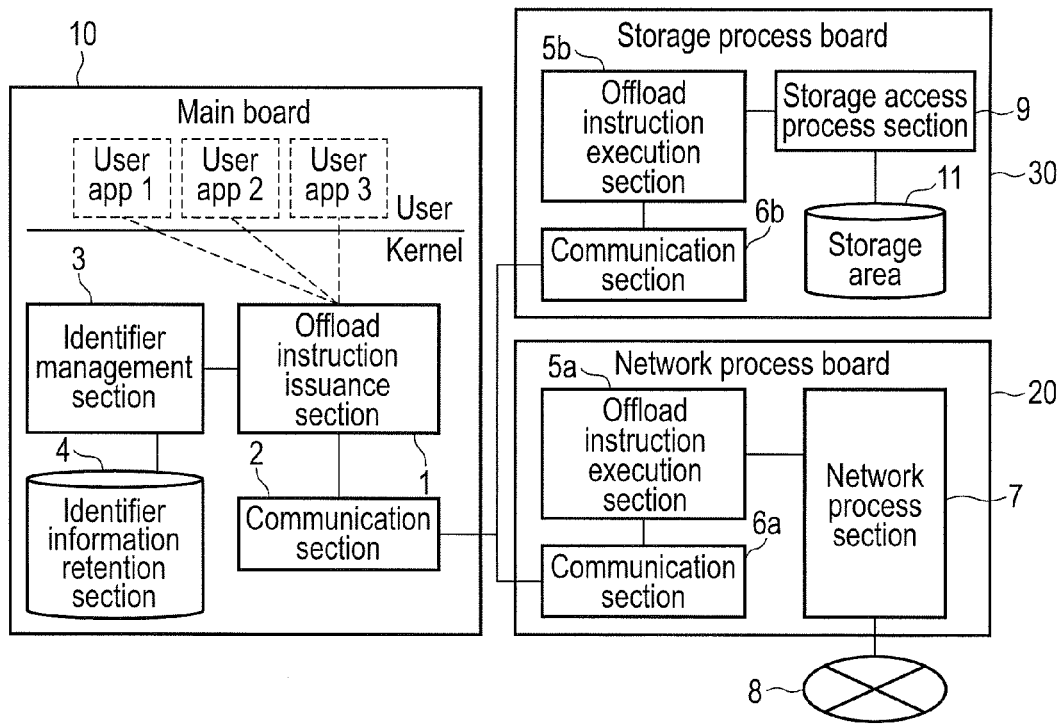
FIG. 21 is a block diagram showing an information processing apparatus according to a sixth embodiment.
Figure 22:
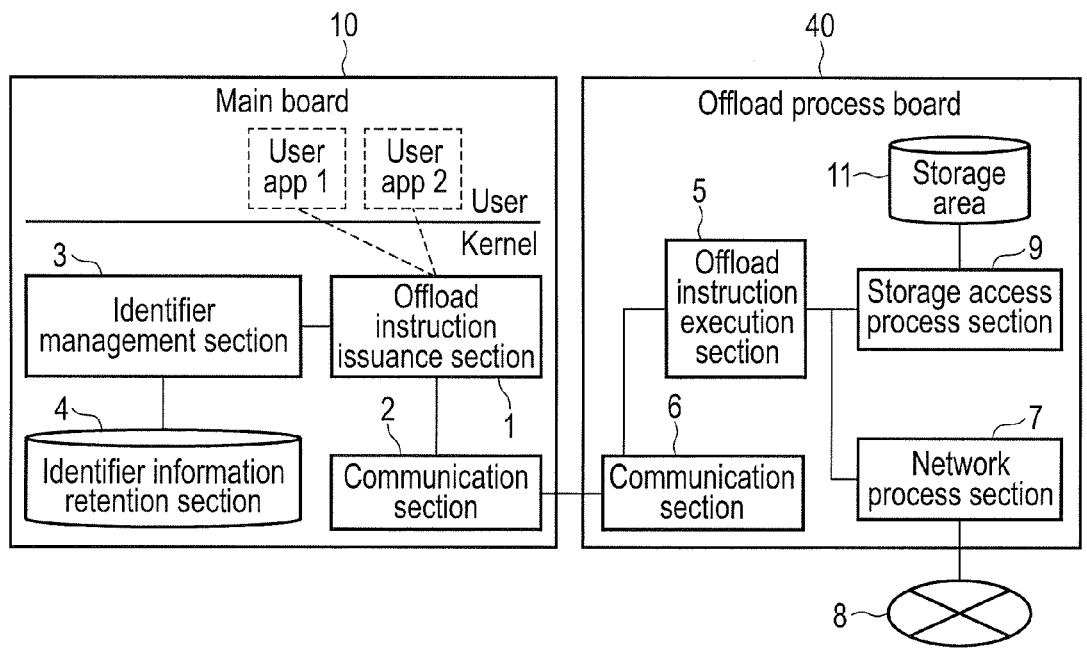
FIG. 22 is a block diagram showing another exemplary configuration of the information processing apparatus according to the sixth embodiment.

FIG. 21 is a block diagram showing an information processing apparatus according to the sixth embodiment; FIG. 22 is a block diagram showing another exemplary configuration of the information processing apparatus. The configuration of a main board 10 is the same as that of the first embodiment. FIG. 21 shows a configuration that simultaneously uses a network process board 20 and a storage process board 30, as offload destinations, where the former contains an offload instruction execution section 5a and a communication section 6a, and the latter contains an offload instruction execution section 5b and a communication section 6b. FIG. 22 shows a configuration that uses, as an offload destination, a single offload process board 40 provided with a network process section 7, a storage access process section 9, and a storage area 11. The offload instruction execution section 5a and the communication section 6a of the network process board 20 are similar to those described for the first embodiment, while the offload instruction execution section 5b and a communication section 6b of the storage process board 30 are similar to those described for the third embodiment. The offload instruction execution section 5 and the communication section 6 of the offload process board 40 shown in FIG. 22 have respective functions of those described for the first and third embodiments. Further, the identifier information retention section 4 retains a board ID in addition to a file descriptor and a process ID in an identifier management table. A characteristic of the present embodiment includes specification of a resource to be offloaded to by retaining a board ID in the identifier management table.

<Description of Operation>

An offload operation using the identifier management table is categorized into three procedures, that is, registration, search, and deletion with respect to the identifier management table.

Registration of Identifier

FIG. 23 is a flowchart showing an operation for registering an identifier according to the sixth embodiment.

Similarly to the case of the first and third embodiments, whether an offload function is to be used is determined by a user setup, the power consumption of a device and the condition of a power supply thereto, a preset profile, the category of user application, and the like (step S81). Immediately after a start of using the offload function, the identifier management table retained by the identifier management section 3 is empty. The work for registering a set of identifiers including the identifier of the main board 10 and that of the storage process board 30 on the identifier management table is carried out in connection with a system call with which a user application requests an OS to prepare a file managed thereby (step S80). Selection of the offload function for either of a network process and a storage process is determined accordingly to the category of the system call and an identifier handed as an argument of the system call. For example, according to Linux, if a socket system call is issued, it can be determined that either of inter-process socket communication and communication on the network 8 is started. In contrast, if an open system is called with a specific position, a file name or the like of a directory structure as an argument, it can be determined that an access to a storage is started. If it is determined that an offload for a network process and for an offload process is started using on the basis of a condition of a profile, and the like, and a condition of a system call, the offload instruction issuance section 1 generates a virtual identifier (step S82) and, simultaneously issues an offload instruction to the network process section 7 or the storage access process section 9 so as to prepare a resource, as in the case of the first and third embodiments (steps S83 and S84). The virtual identifier, the identifier on the network process board 20, the identifier generated by the offload instruction execution section 5, the ID of the process that has called the system call, and an offload process category ID are registered in the identifier management section 3 (step S86). The virtual socket number is returned to the user application (step S87).

Search for Identifier

FIG. 24 is a flowchart showing an operation for searching for an identifier according to the second embodiment. An exemplary operation in the case of FIG. 22 is described in the following.

When a user application is to perform input into or output from a resource managed by the OS, a system call is issued without exception (step S90). The categories of the system calls are similar to the ones noted in the first and third embodiments. If a socket number (or a process ID in addition to the socket number if there is a plurality of user applications) that is one argument of those of a system call exists in the identifier management table, the system call can be determined to be related to an offload function, with a resource already secured at the offload process board 40 (step S91). The offload instruction issuance section 1 generates an offload instruction with at least one or more arguments of those other than an identifier, of system call arguments, and with another identifier produced by the identifier management section 3 converting the identifier into an identifier on an offload process board 40 as an argument (step S92), thereby requesting the offload process board 40 to execute the offload instruction, the board determined on the basis of the offload process category ID (step S93). The offload instruction execution section 5 of the offload process board 40 causes the network process section 7 or the storage access process section 9 to execute the received offload instruction and returns a result of the execution to the offload instruction issuance section 1. The offload instruction issuance section 1 receives the result of the execution of the offload instruction from the offload instruction execution section 5 as a return value and returns the data to the user application as the return value of the system call (step S96).

Deletion of Identifier

Figure 25:
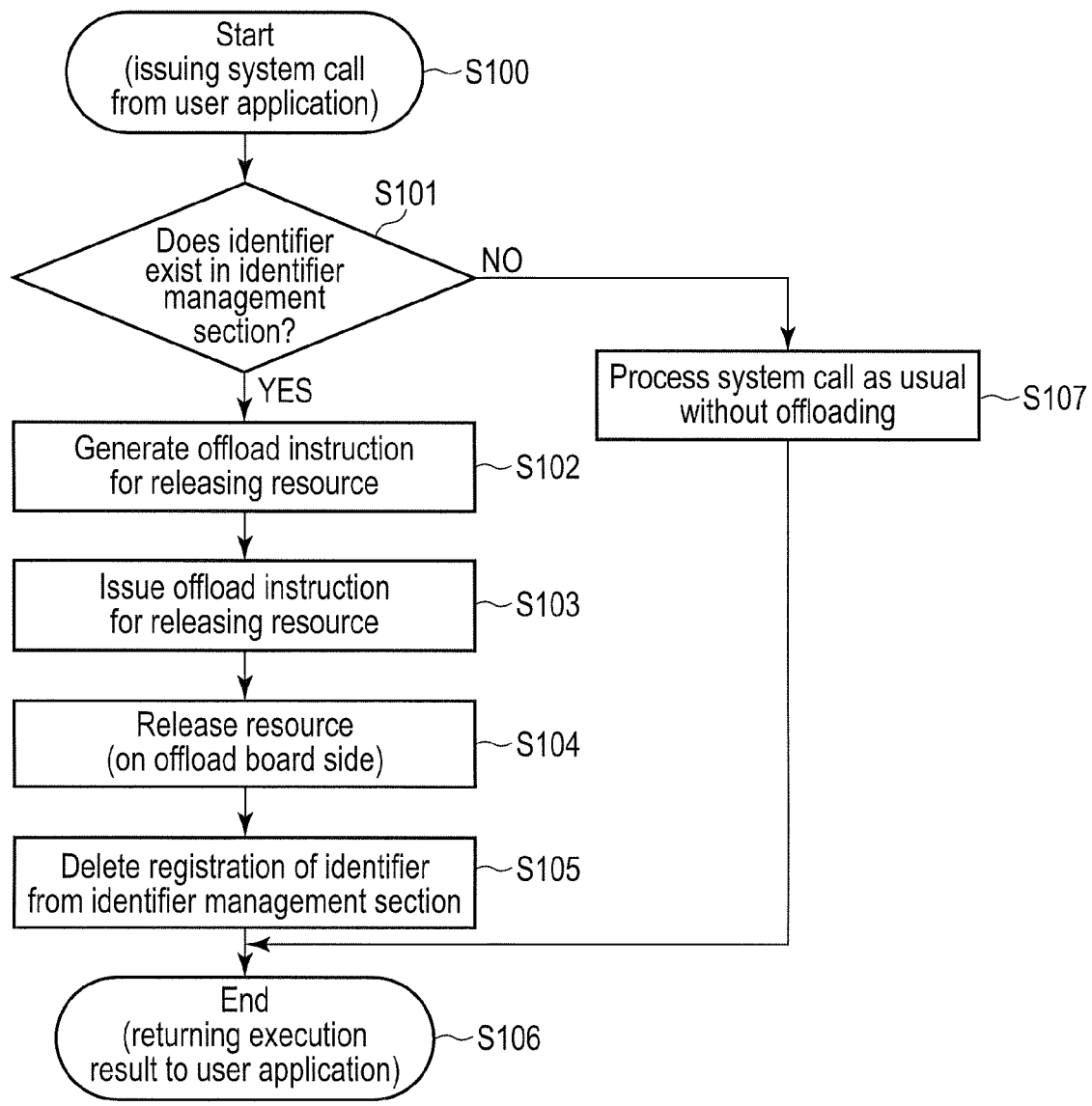
FIG. 25 is a flowchart showing an operation for deleting the identifier according to the sixth embodiment.

FIG. 25 is a flowchart showing an operation for deleting the identifier according to the sixth embodiment.

When a user application is to release a resource managed by an OS, a system call is issued without exception (step S100). In this event, if an identifier that is one of arguments of the system call exists in the identifier management table, the system call can be determined to be related to the offload function (step S101). If the system call is determined to be related to the offload function, the offload instruction issuance section 1 searches the identifier management section 3 for an identifier on the offload process board 40, the identifier corresponding to an identifier that is one of arguments of the system call. In this event, the offload instruction issuance section 1 also searches for an offload category. The offload instruction issuance section 1 generates, on the basis of the offload category ID, an offload instruction for requesting the network process section 7 or the storage access process section 9 that has secured a resource on the offload process board 40 to release the resource related to the identifier (step S102), thereby requesting the offload instruction execution section 5 of the offload process board 40 to execute the processing (step S103). The offload instruction execution section 5 releases the applicable resource (step S104). The identifier management section 3 deletes the registration of an identifier corresponding to the released resource (step S105). A result of the execution of the resource release instruction is returned to the offload instruction issuance section 1, which then returns the data of the result to the user application as the return value of the system call (step S106).

Seventh Embodiment

The seventh embodiment is configured to enable an offload destination to execute also a task other than an offload instruction. Accordingly, the present embodiment includes therein an offload task management section that manages a task to be autonomously operated, in addition to the configuration of the first embodiment. The configuration and operations of the present embodiment similar to those of the first embodiment are not described in detail in the following.
<Description of Configuration>

FIG. 26 is a block diagram showing an information processing apparatus according to the seventh embodiment.

Similarly to the case of the first embodiment, a main board 10 includes therein the offload instruction issuance section 1, the communication section 2, the identifier management section 3, and the identifier information retention section 4. The network process board 20 includes therein the offload task management section 16 in addition to the offload instruction execution section 5, the network process section 7 and the communication section 6 of the first embodiment. The offload task management section 16 manages execution of a task to be autonomously operated.

As a premise, a system call for an offload process is newly defined with respect to autonomous operation of a task.
<Description of Operation>

FIG. 27 is a flowchart showing an operation for registering an identifier according to the seventh embodiment; and FIG. 28 is a sequence diagram showing the operation for registering the identifier according to the seventh embodiment.

When a user application has called the new system call, an OS generates a virtual identifier (step S112). At the same time, the offload instruction execution section 5 generates a new standby task at the offload task management section 16 of the network process board 20. The generated virtual identifier and the identifier of the standby task are registered in the identifier management section 3 (steps S113 through S117).

Reference to Identifier

When a system call is issued from a user application, with the virtual identifier as an argument, the identifier management section 3 is searched for the identifier of a standby task. The system call defined as that here is to write (output) using the virtual identifier as an argument. By so doing, a standby task to be autonomously operated is loaded onto the offload process board 40. FIG. 29 shows a flowchart of the operation for loading the offload program (steps S120 through S127). In step S124, the standby task is loaded onto the offload process board 40.

A result of the execution can be read by performing read to the virtual identifier. FIG. 30 shows the operation for receiving the result of the execution (steps S130 through S137). In step S135, the result of the execution of the standby task is returned from the offload task management section 16 to be returned to the offload instruction issuance section 1.

FIG. 31 is a sequence diagram showing the loading operation of the offload program and the operation for receiving the result of the execution, which are described above.

Figure 32:
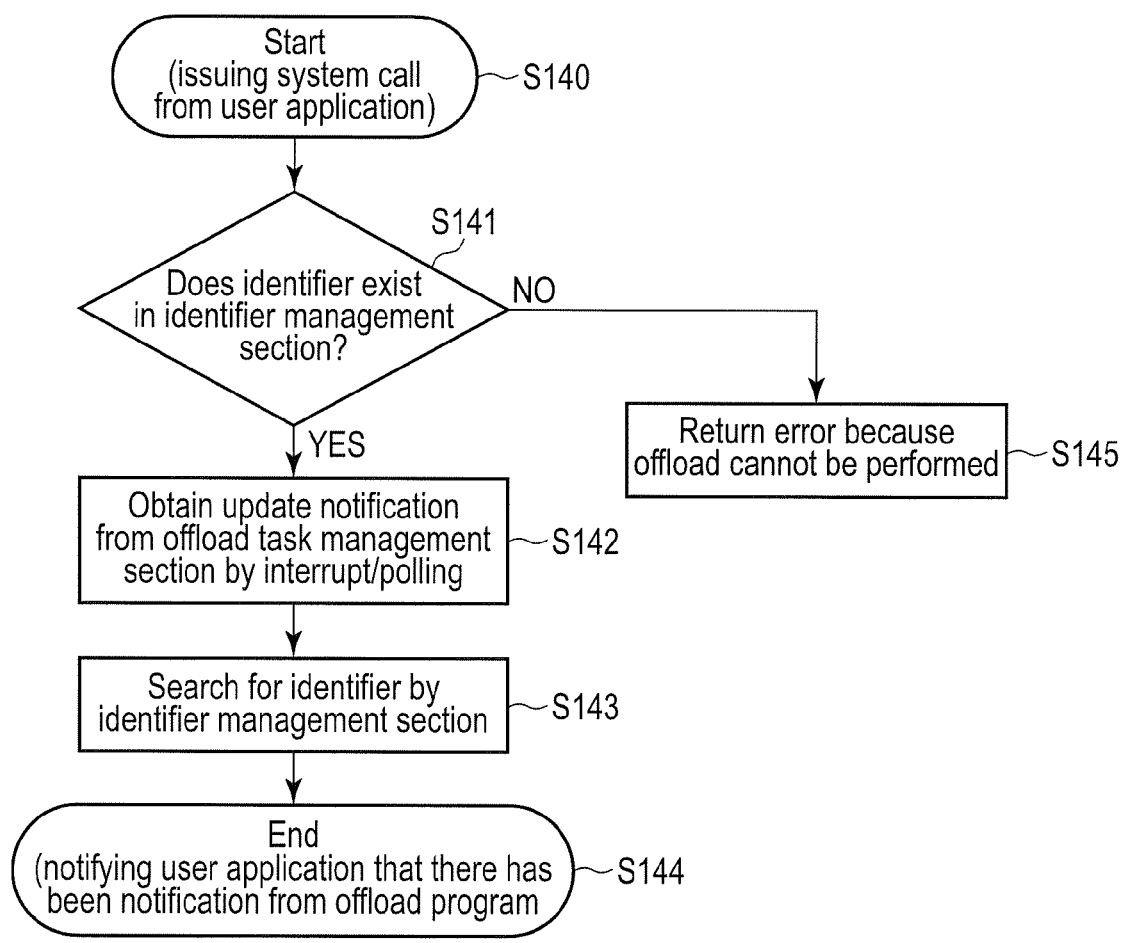
FIG. 32 is a flowchart showing an operation for receiving an update notification from an offload task management section according to the seventh embodiment.

Notification of completion of the processing can be realized by interrupt, polling, and the like. The operation for receiving a notification of update from the offload task management section 16 is shown in the flowchart of FIG. 32 and in the sequence diagram of FIG. 31 (steps S140 through S145). In step S142, the notification of update (i.e., a notification from the standby task) is obtained from the offload task management section 16 by means of interrupt, polling, and the like, and the notification is returned to the user application in step S144.

Deletion of Identifier

Figure 34:
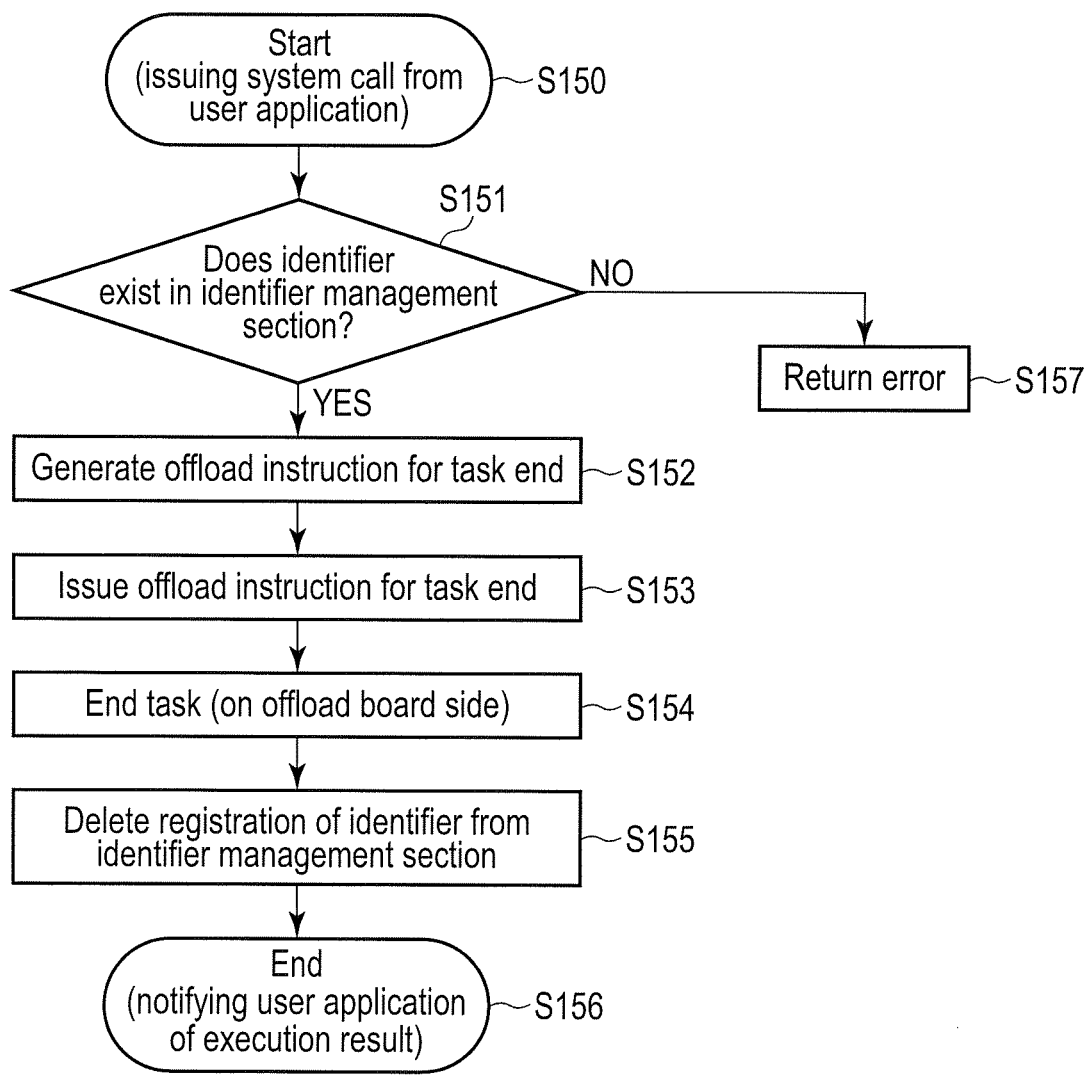
FIG. 34 is a flowchart showing an operation for ending an offload task according to the seventh embodiment.
Figure 35:
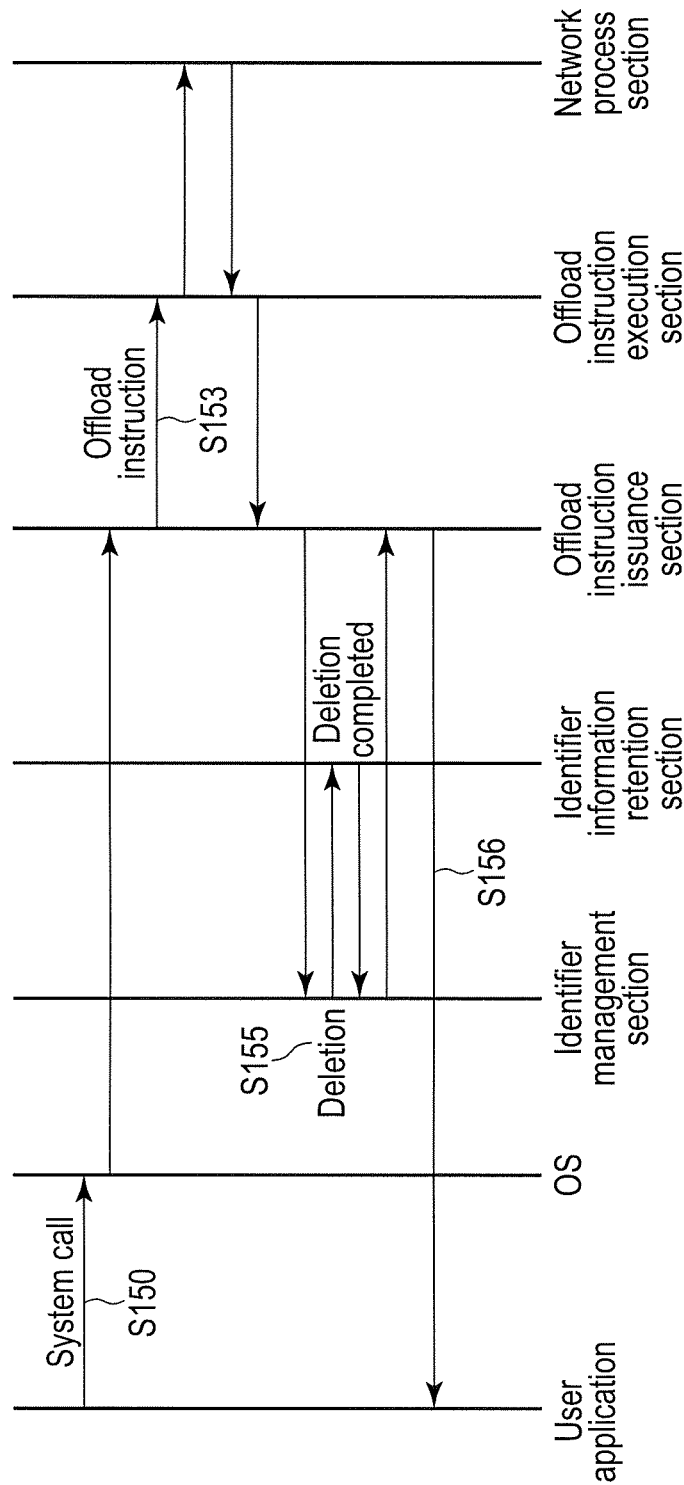
FIG. 35 is a sequence diagram showing the operation for ending the offload task according to the seventh embodiment.

FIG. 34 is a flowchart showing an operation for ending an offload task according to the seventh embodiment; and FIG. 35 is a sequence diagram showing the operation for ending the offload task according to the seventh embodiment.

Similarly to the case of the first embodiment, when a user application is to release a resource, a system call is issued (step S150). For example, a system call for closing a virtual identifier is issued. When the system call is issued, a task in the offload task management section 16 is ended (steps S152 through S154). An entry is deleted also from the identifier management table (step S155), and the user application is notified of the completion of releasing the resource (step S156).

Eighth Embodiment

The eighth embodiment relates to an exemplary operation of the offload task noted in the seventh embodiment. The configuration and operations of the present embodiment similar to those of the first embodiment are not described in detail in the following.

An offload task according to the eighth embodiment accumulates, in a buffer, a given amount of data received from the network 8. A main CPU of the main board 10 shifts a mode to the low-power consumption mode. When receiving of data from the network 8 is completed, or if the data accumulated in the buffer exceeds a given amount, the main board 10 is notified of such event. In response to the notification, the main board 10 receives the data accumulated in the buffer in a lump from the network process board 20.

Ninth Embodiment

The ninth embodiment relates to another exemplary operation of the offload task in the seventh embodiment. The configuration and operations of the present embodiment similar to those of the first embodiment are not described in detail in the following. Similarly to the case of the eighth embodiment, an offload task according to the ninth embodiment accumulates the data received from the network 8 in a buffer. Further, the offload task of the ninth embodiment refers to the data accumulated in the buffer to determine whether to notify the main board 10 of the event of receiving the data. At this stage, the main board 10 is in the low-power consumption mode, namely, for example, a sleep mode.

The data received from the network 8 contains, for example, a new incoming mail, an update file of an application, and schedule data. When data that requires an instant notification, the data such as a new incoming mail and schedule data, is received, the offload task of the ninth embodiment notifies the main board 10 of such event. In contrast, when data that requires no instant notification is received, the offload task accumulates the data in the buffer and does not notify the main board 10 of the event. It is appreciated that a configuration may enable setup of a category of data requiring such notification.

When such notification is received from the offload task of the network process board 20, the main board 10 recovers from a sleep mode and quickly carries out a data reception process. Data accumulated in the buffer, instead of being notified of at the reception of the data is put into a reception process in a lump, for example, upon recovery from the sleep mode.

The embodiments described above enable the realization of offloading of instructions by means of a conversion function of an identifier capable of uniquely specifying a resource.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:
a determiner that determines whether processing specified by an offload instruction is executed based on at least one of a user setup, a ratio of power consumption of a device to a power supply thereto, a residual battery capacity, a profile in which a pre-set power saving policy is described, whether a quick response is require of an application, and whether the application performs an intermittent operation;
an issuer that issues the offload instruction corresponding to a first process executed in company with a first identifier capable of uniquely specifying a resource of a first arithmetic operation device, if the determiner determines that the processing is executed; and
a communicator that transmits the offload instruction to a second arithmetic operation device and receives a result of execution of the offload instruction from the second arithmetic operation device, wherein,
in the second arithmetic operation device, the first identifier contained in the offload instruction is converted into a second identifier capable of uniquely specifying a resource of the second arithmetic operation device, and processing specified by the offload instruction is executed.

2. The apparatus according to claim 1, wherein the first identifier contains a first file identifier, a socket identifier, or a device identifier, all corresponding to a resource of the first arithmetic operation device, and the second identifier contains a second file identifier, a socket identifier, or a device identifier, all corresponding to a resource of the second arithmetic operation device.

3. The apparatus according to claim 1, further comprising a retainer that retains an identifier conversion table that correlates the second identifier with the first identifier capable of uniquely specifying the second identifier.

4. The apparatus according to claim 3, further comprising:
a first arithmetic operation device including therein the issuer, the communicator, and the retainer; and
a network process device that executes a network process in accordance with the offload instruction and transmitting a result of the execution of the offload instruction to the first arithmetic operation device.

5. The apparatus according to claim 1, further comprising:
a first arithmetic operation device including therein the issuer and the communicator; and
a second arithmetic operation device which: retains an identifier conversion table that correlates the second identifier that is generated on the basis of the offload instruction and instructs securing of a resource of the second arithmetic operation device with the first identifier capable of uniquely specifying the second identifier; executes a network process in accordance with the offload instruction; and transmits a result of the execution of the offload instruction to the first arithmetic operation device.

6. The apparatus according to claim 3, further comprising:
a first arithmetic operation device including therein the issuer, the communicator, and the retainer; and
a storage process device that executes a storage process in accordance with the offload instruction and transmits a result of the execution of the offload instruction to the first arithmetic operation device.

7. The apparatus according to claim 1, further comprising:
a first arithmetic operation device including therein the issuer and the communicator; and
a storage process device which: retains an identifier conversion table for correlating the second identifier that is generated on the basis of the offload instruction and instructs securing of a resource of the second arithmetic operation device with the first identifier capable of uniquely specifying the second identifier; executes a storage process in accordance with the offload instruction; and transmits a result of the execution of the offload instruction to the first arithmetic operation device.

8. The apparatus according to claim 3, further comprising:
a first arithmetic operation device including therein the issuer, the communicator, and the retainer;
a network process device that executes a network process in accordance with the offload instruction and transmits a result of the execution of the offload instruction to the first arithmetic operation device; and
a storage process device that executes a storage process in accordance with the offload instruction and transmits a result of the execution of the offload instruction to the first arithmetic operation device, wherein
the retainer retains a device identifier for identifying the network process device and the storage process device.

9. The apparatus according to claim 4, wherein the network process device comprises a network processor that switches over communication interfaces or communication methods, both used for the network process, in accordance with an operation mode.

10. The apparatus according to claim 4, wherein the network process device comprises a network processor that switches over, in accordance with the offload instruction, communication protocols or layers of communication protocols, all to be used for the network process.

11. The apparatus according to claim 4, wherein the network process device comprises a network processor that switches over, in accordance with the offload instruction, reception buffers or transmission queues to be used for the network process.

12. The apparatus according to claim 4, wherein
the network process device comprises buffers for storing data received from a network by means of the network process, and
the network processer notifies the issuer of the data stored in the buffers in a lump.

13. The apparatus according to claim 4, wherein
the first arithmetic operation device shifts a state to a low-power consumption state during execution of the offload instruction and
releases the low-power consumption state in response to a notification from the second arithmetic operation device.

14. The apparatus according to claim 1, further comprising a task manager that manages a task to be autonomously operated in the second arithmetic operation device, wherein
the task manager carries out loading of the task, and notification of a result of execution of the task in accordance with the offload instruction.

15. A method for offloading an instruction, comprising:
determining whether processing specified by an offload instruction is executed based on at least one of a user setup, a ratio of power consumption of a device to a power supply thereto, a residual battery capacity, a profile in which a pre-set power saving policy is described, whether a quick response is require of an application, and whether the application performs an intermittent operation;
issuing the offload instruction in response to a system call from a first arithmetic operation device, the system call containing, as an argument, a first identifier capable of uniquely specifying a resource, if the determining determines that the processing is executed; and
transmitting the offload instruction to a second arithmetic operation device and receiving a result of execution of the offload instruction from the second arithmetic operation device, wherein
the first identifier contained in the offload instruction is converted into a second identifier capable of uniquely specifying a resource of the second arithmetic operation device, and processing specified by the offload instruction is executed, whereby a return value of the system call is generated by using the result.

* * * * *